US011719376B1

(12) United States Patent
Olsson et al.

(10) Patent No.: US 11,719,376 B1
(45) Date of Patent: *Aug. 8, 2023

(54) DOCKABLE TRIPODAL CAMERA CONTROL UNIT

(71) Applicant: SeeScan, Inc., San Diego, CA (US)

(72) Inventors: Mark S. Olsson, La Jolla, CA (US); Dawn E. Shaffer, San Diego, CA (US); Eric M. Chapman, Lake Tapps, WA (US); Jesse O. Casares, El Cajon, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/352,706

(22) Filed: Jun. 21, 2021

Related U.S. Application Data

(63) Continuation of application No. 16/446,456, filed on Jun. 19, 2019, now Pat. No. 11,047,516, which is a continuation of application No. 13/774,351, filed on Feb. 22, 2013, now Pat. No. 10,371,305.

(60) Provisional application No. 61/602,527, filed on Feb. 23, 2012, provisional application No. 61/602,065, filed on Feb. 22, 2012.

(51) Int. Cl.
  *A61B 1/00* (2006.01)
  *A61B 1/06* (2006.01)
  *H04N 7/18* (2006.01)
  *F16L 55/26* (2006.01)

(52) U.S. Cl.
  CPC ............... *F16L 55/26* (2013.01); *H04N 7/18* (2013.01)

(58) Field of Classification Search
  CPC ................................. F16L 55/26; H04N 7/18
  See application file for complete search history.

(56) References Cited

U.S. PATENT DOCUMENTS

| 6,505,525 B2* | 1/2003 | McGrew | G01M 3/38 |
| | | | 73/865.8 |
| 8,437,124 B2* | 5/2013 | Dai | H02S 30/20 |
| | | | 348/835 |
| 2005/0129108 A1* | 6/2005 | Bendall | A61B 1/00042 |
| | | | 375/240.01 |

(Continued)

FOREIGN PATENT DOCUMENTS

| GB | 2220070 | * 4/1989 |
| JP | 3699879 B2 | * 3/2000 |

(Continued)

OTHER PUBLICATIONS

Noguchi N, translation of JP-2009246864-A, Oct. 2009 (Year: 2009).*
Imai M, ranslation ofJP-3699879-B2, Sep. 2005 (Year: 2005).*

*Primary Examiner* — Zaihan Jiang
(74) *Attorney, Agent, or Firm* — Steven C. Tietsworth, Esq.; Michael J. Pennington, Esq.

(57) ABSTRACT

Pipe inspection systems including cameras and camera control units (CCU) are disclosed. A CCU may include a switching circuit for automatically controlling power to elements of the CCU in response to movement of a display cover. A display of the CCU may display captured images and/or video, which may be integrated with data provided by a buried object locator or other device. The CCU may include a retractable kickstand assembly and a stowable handle, which may be removably attached to a cable storage reel.

17 Claims, 17 Drawing Sheets

(56) References Cited

U.S. PATENT DOCUMENTS

| | | | | |
|---|---|---|---|---|
| 2005/0275725 A1* | 12/2005 | Olsson | .................... | H04N 23/63 |
| | | | | 348/E5.026 |
| 2006/0203833 A1* | 9/2006 | Hara | .................... | H04W 52/322 |
| | | | | 370/401 |
| 2007/0104477 A1* | 5/2007 | Misawa | .................. | H04N 23/51 |
| | | | | 348/E5.026 |
| 2008/0015042 A1* | 1/2008 | Glass | ................. | A63B 69/3608 |
| | | | | 473/217 |
| 2008/0211521 A1* | 9/2008 | Lock | .................... | G01N 27/048 |
| | | | | 324/696 |
| 2009/0190633 A1* | 7/2009 | Smith | .................... | H04B 1/123 |
| | | | | 375/346 |
| 2011/0203394 A1* | 8/2011 | Tinlin | .................... | B08B 9/0495 |
| | | | | 73/866.5 |
| 2012/0204307 A1* | 8/2012 | De Mattei | ........ | H04N 21/42203 |
| | | | | 2/69 |

FOREIGN PATENT DOCUMENTS

| | | | |
|---|---|---|---|
| JP | 3699879 B2 | * | 9/2005 |
| JP | 2009246864 A | * | 3/2008 |
| JP | 2009246864 A | * | 10/2009 |
| WO | WO 2012024660 | * | 8/2011 |
| WO | WO-2012024660 | * | 8/2011 |

* cited by examiner

Example Camera Sub-System Embodiment

Example Camera Control Unit (CCU) Sub-System Embodiment

DOCKABLE TRIPODAL CAMERA CONTROL UNIT

CROSS-REFERENCE TO RELATED APPLICATIONS

This application is a continuation of and claims priority to co-pending U.S. Utility patent application Ser. No. 16/446,456, filed Jun. 19, 2019, entitled DOCKABLE TRIPODAL CAMERA CONTROL UNIT, which is a continuation of and claims priority to U.S. Utility patent application Ser. No. 13/774,351, now U.S. Pat. No. 10,371,305, filed Feb. 22, 2013, entitled DOCKABLE TRIPODAL CAMERA CONTROL UNIT, which claims priority under 35 U.S.C. § 119(e) to U.S. Provisional Patent Application Ser. No. 61/602,065, filed Feb. 22, 2012, entitled DOCKABLE TRIPODAL CAMERA CONTROL UNIT, and to U.S. Provisional Patent Application Ser. No. 61/602,527, filed Feb. 23, 2012, entitled DOCKABLE TRIPODA CAMERA CONTROL UNIT. The content of each of these applications is hereby incorporated by reference in its entirety for all purposes.

FIELD

This disclosure relates generally to apparatus, systems, and methods for the inspection of pipes, tubes, conduits, hidden or buried cavities, and the like. More specifically, but not exclusively, the disclosure relates to man-portable cameras and camera control units (CCUs) for monitoring and controlling the camera and managing areas being viewed and imaged by the cameras, as well as data collected from the camera and associated systems during such inspections.

BACKGROUND

There are many situations where it is desirable to internally inspect long lengths of pipe that are already in place, either underground, in a building, or underwater. For example, sewer and drain pipes frequently must be internally inspected to diagnose any existing problems and to determine if there are any breaks causing leakage or obstructions impairing the free flow of waste. It is also important to internally inspect steam pipes, heat exchanger pipes, water pipes, gas pipes, electrical conduits, and fiber optic conduits for similar reasons. It is sometimes necessary to internally inspect several hundred feet up to thousands of feet of pipe.

Conventional video pipe inspection systems include a video camera head that is forced down the pipe to display the pipe interior on a video display. The inspection is commonly recorded using a video recorder (VCR) or digital video disk (DVD) and more recently on removable drives such as USB thumb-drives or the like. Conventional video pipe inspection systems have included a semi-rigid push-cable that provides an electromechanical connection between the camera head that encloses and protects the video camera and a rotatable push reel or cable storage drum that is used to pay out push-cable and force the camera head down the pipe. Examples of suitable video push-cables are disclosed in U.S. Pat. No. 5,457,288 issued Oct. 10, 1995 to Mark S. Olsson and U.S. Pat. No. 5,808,239 issued Sep. 15, 1998 to Mark S. Olsson.

Camera control units are important for managing the camera at the far end of an inspection run, capturing images of areas of interest as still shots or video clips, turning the camera and its built-in sonde transmitter on and off, and viewing the camera's visual data while the inspection is in progress. Because technicians using pipe inspection systems often have to carry their equipment to remote locations such as rooftops and cleanouts not accessible by vehicle, it is important that such equipment be readily man-portable and stable enough to be safely used from a rooftop or other awkward location. The displayed image of the camera's field of view must be large enough to allow the technician to see it clearly during an inspection. Traditional camera control units are often bulky and often must be carried to a job site separately from the corresponding reel and cable drum, necessitating multiple trips by a solo operator.

SUMMARY

This disclosure relates generally to apparatus, systems, and methods for the inspection of pipes, tubes, conduits and the like. More specifically, but not exclusively, the disclosure relates to camera control units for monitoring and controlling the camera and managing views from the camera during such inspections.

For example, in one aspect, the disclosure relates to a lightweight, man-portable pipe inspection camera controller unit (CCU) allowing handheld operation when convenient, and being readily reconfigurable for resting on a horizontal surface facilitated by a unique tripodal support for ease of viewing during an inspection.

In another aspect, the disclosure relates to a pipe inspection camera control unit with wireless communication links for exchanging data with, for example, a buried object locator being used to track the progress of a camera head underground, or other external devices used in conjunction with locating and inspection tasks. Depth, position, or other data from the buried object locator may be sent to a corresponding CCU for association with images, video, and/or other inspection data for display, storage, and/or transmission.

In another aspect, the disclosure relates to a pipe inspection camera control unit including a plurality of USB or other removable memory ports and associated electronic circuitry configured to allow a user/technician to store images from the camera on one USB drive while using a second USB drive to store a prepared report using such images, such as might be delivered to a homeowner, for example. The ports may be protected by a cover against ambient moisture, corrosion, etc., and the cover may be dimensioned as to allow devices of varying standard depths to be used without interfering with said protection. A plurality of USB or other removable memory device ports may be configured in a stepped configuration to accommodate removable devices of various sizes or shapes.

In another aspect, the disclosure relates to a pipe inspection camera control unit with a counterweighted handle providing balance in hand-held use and stability when the unit is standing on a surface, and a foldable support leg form which forms a tripodal support in combination with the handle, with snap-locking open and closed positions. The handle may include an anti-slip segment or section to improve the user grip.

In another aspect, the disclosure relates to a pipe inspection camera control unit with a protective sun hood or cover equipped with a sensing switch and circuitry to respond to the state of the sun hood by powering up the CCU, putting it into sleep or hibernation modes, waking it up upon opening of the cover, and the like.

In another aspect, the disclosure relates to a pipe inspection system. The pipe inspection system may include, for example, a camera, a push-cable including a plurality of conductors electrically coupled to the camera at a distal end, a cable reel for storing the push-cable, and a camera control unit (CCU) electrically coupled to the plurality of conductors at a proximal end. The CCU may include a body having a handle, one or more electronic circuits for controlling operation of components of the CCU, a display, and a display cover.

In another aspect, the disclosure relates to a cable-reel cradle to which a camera control unit can be readily attached for portability and easily released for use.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1A:
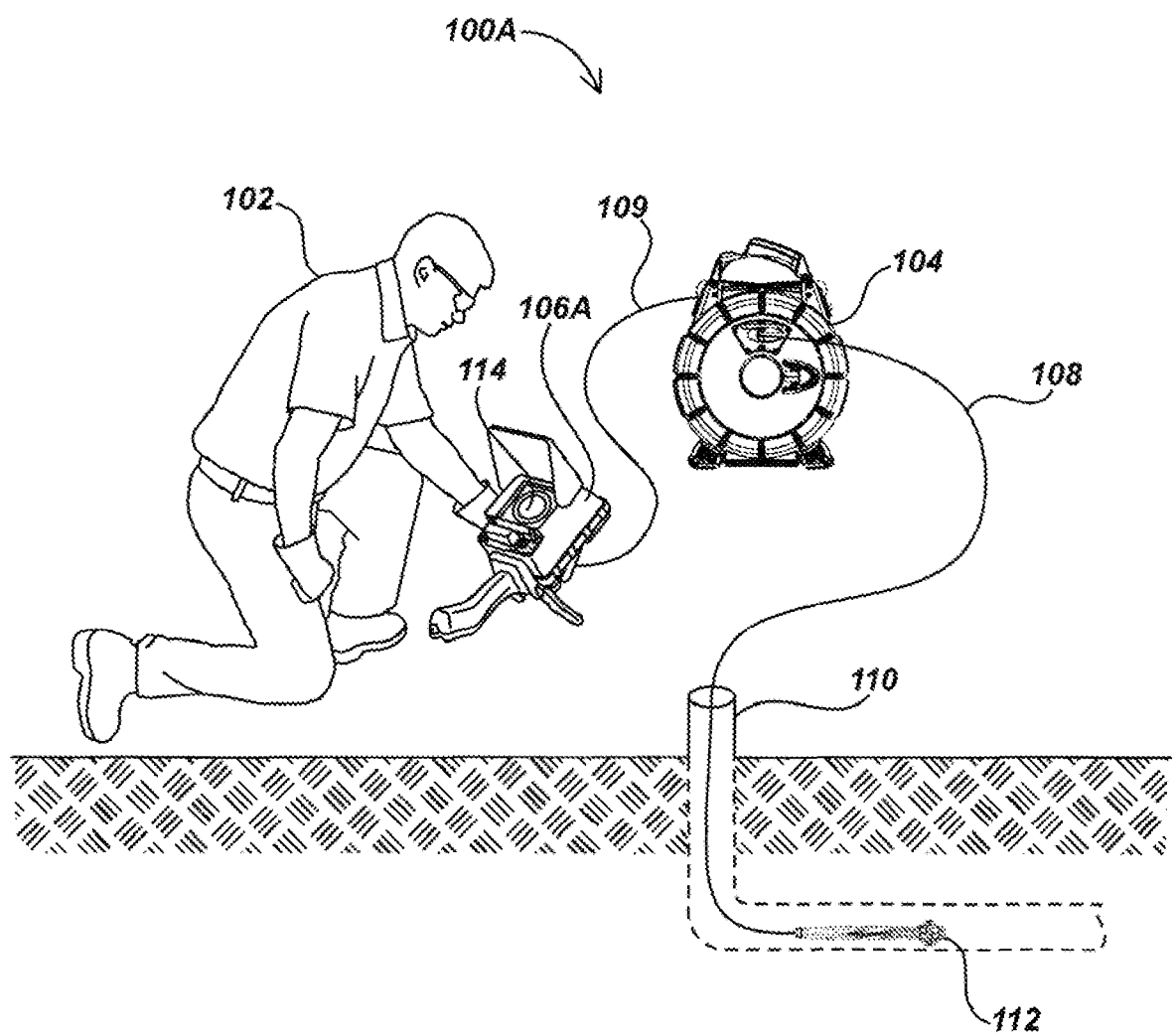
FIG. 1A is an illustration of an exemplary embodiment of the present disclosure as deployed in use, in inspecting a buried pipe with an above-ground header.

In various embodiments, the disclosures herein may be combined with the disclosures of co-assigned United States patents and patent applications including U.S. patent application Ser. No. 61/034,907, filed Mar. 7, 2008, entitled PIPE INSPECTION IMAGING SYSTEM, which describes various details of embodiments of cameras and image and video capture and processing, U.S. patent application Ser. No. 12/371,540, filed on Feb. 13, 2009, entitled HIGH PERFORMANCE PUSH CABLES, which described various details of embodiments of push-cables for use with pipe inspection systems, U.S. Pat. No. 5,808,239, issued Sep. 15, 1998, entitled VIDEO PUSH CABLE, which describes various details of push-cables with conductors for sending image/video signals from a camera to a CCU, U.S. patent application Ser. No. 13/346,668, filed Jan. 9, 2012, entitled POTABLE CAMERA CONTROLLER PLATFORM FOR USE WITH PIPE INSPECTION SYSTEM, which described various details of camera control units and associated components and signal processing, display, and storage, and U.S. patent application Ser. No. 13/532,721, filed Jun. 25, 2012, entitled MODULAR BATTERY PACK APPARATUS, SYSTEMS, AND METHODS, which described various intelligent battery devices and associated docking systems and associated monitoring, control, and data transfer functionality. The content of each of these applications is incorporated by reference herein in its entirety.

In addition, co-assigned patents and patent applications describing various details of buried object or cable locators that may be used in conjunction with the camera control units and camera functions disclosed herein include U.S. patent application Ser. No. 10/268,641, entitled OMNIDIRECTIONAL SONDE AND LINE LOCATOR, filed on Oct. 9, 2002, U.S. patent application Ser. No. 11/970,818, entitled MULTI-SENSOR MAPPING OMNIDIRECTIONAL SONDE AND LINE LOCATORS, filed on Jan. 8, 2008, U.S. patent application Ser. No. 12/016,870, entitled RECONFIGURABLE PORTABLE LOCATOR EMPLOYING MULTIPLE SENSOR ARRAY HAVING FLEXIBLE NESTED ORTHOGONAL ANTENNAS, filed Jan. 18, 2008, U.S. patent application Ser. No. 11/077,947, entitled SINGLE AND MULTI-TRACE OMNIDIRECTIONAL SONDE AND LINE LOCATORS AND TRANSMITTER USED THEREWITH, now U.S. Pat. No. 7,619,516, U.S. patent application Ser. No. 13/161,183, filed Jun. 15, 2011, entitled GROUND-TRACKING DEVICES FOR USE WITH A MAPPING LOCATOR, and U.S. patent application Ser. No. 61/485,078, entitled LOCATOR ANTENNA CONFIGURATION, filed on May 11, 2011, The content of each of these applications is also incorporated by reference herein in its entirety.

This disclosure relates generally to apparatus, systems, and methods for the inspection of pipes, tubes, conduits, hidden or buried cavities, and the like. More specifically, but not exclusively, the disclosure relates to video inspection systems including man-portable cameras, along with camera control units (CCUs) for monitoring and controlling the camera and managing areas being viewed and imaged by the camera, as well as data collected from the camera and associated systems, such as buried object locators or other devices, during such inspections.

For example, in one aspect, the disclosure relates to a lightweight, man-portable pipe inspection camera controller unit (CCU) allowing handheld operation when convenient, and being readily reconfigurable for resting on a horizontal surface facilitated by a unique tripodal support for ease of viewing during an inspection.

In another aspect, the disclosure relates to a pipe inspection camera control unit with wireless communication links, such as Wi-Fi, Bluetooth, cellular, or other wireless links for exchanging data with, for example, a buried object locator being used to track the progress of a camera head underground, or other external devices used in conjunction with locating and inspection tasks. Depth, position, location or other data from the buried object locator may be sent to a corresponding CCU for association with images, video, and/or other inspection data for display, storage, or transmission.

In another aspect, the disclosure relates to a pipe inspection camera control unit including a plurality of USB or other removable memory ports and circuitry which enables a user/technician to store images from the camera on one USB drive while using a second USB drive to store a prepared report using such images, such as might be delivered to a homeowner, for example. The ports may be protected by a cover against ambient moisture, corrosion, etc., and the cover may be dimensioned as to allow devices of varying standard depths to be used without interfering with said protection. A plurality of USB or other ports may be configured in a stepped configuration to accommodate removable devices of various sizes or shapes.

In another aspect, the disclosure relates to a pipe inspection camera control unit with a counterweighted handle providing balance in hand-held use and stability when the unit is standing on a surface, and a foldable support leg form which forms a tripodal support in combination with the handle, with snap-locking open and closed positions. The handle may include an anti-slip segment or section to improve the user grip.

In another aspect, the disclosure relates to a pipe inspection camera control unit with a protective sun hood or cover equipped with a sensing switch and circuitry to respond to the state of the sun hood by powering up the CCU, putting it into sleep or hibernation modes, waking it up upon opening of the cover, and the like.

In another, the disclosure relates to a system for monitoring a pipe inspection process, providing a man-portable hand-held monitoring system. Such a device may be equipped with a tripodal support system of which the handle may serve as one support. For ease of use the other two supports of the tripod may be formed into a rotatable kickstand capable of being snapped into at least two useful positions, such as for standing the device on a surface and for holding the device by hand. In such a device the handle may be counterweighted for stability, and may be fitted with at least one friction edge of suitable material to minimize slippage during handheld use.

In another aspect, the disclosure relates to a portable camera control unit able to capture screen shots and video clips from the camera head during a pipe-inspection process. Such capabilities may be controlled from an integrated keypad or other user-interface device, a portable camera control unit, or CCU, may be equipped to automatically log images during a pipe-inspection, or to capture such images or video segments based on operator actuation of a control. The recording system may be equipped with storage media including an internal drive and a plurality of removable drive ports. The ports may accommodate, for example, removable USB thumb drives or other media or compatible devices including WiFi or Bluetooth devices for local communication links, which devices may be protected from corrosion and moisture by appropriately designed shielded receptacles. Such a CCU, for example, may record continuously to one drive while using the other to generate a deliverable report of a pipe inspection to a client or manager.

In another aspect, the disclosure relates to a camera control unit equipped with wireless communication modules, such as an ISM radio link or other wireless link to exchange data with other devices such as locators, beacons, and transmitters used in buried object locating operations or inspection operations. Other forms of machine-to-machine communications, such as wired connections, may also be used in some embodiments.

In another aspect, the disclosure relates to a camera control unit with a protective folding sun hood equipped with sensing switches enabling the sun hood to initiate state changes in the CCU (such as, for example, waking it from a sleep or hibernate state, powering it up from an off state, or powering it down when the sun hood is closed).

In another aspect the disclosure relates to a man-portable camera control unit (CCU) which can be readily docked to a pipe-inspection reel for ease of transport, and secured thereto using a self-attaching material such as Velcro or other attachment mechanisms.

In another aspect the disclosure relates to a pipe inspection system. The pipe inspection system may include, for example, a camera, a push-cable including a plurality of conductors electrically coupled to the camera at a distal end, a cable reel for storing the push-cable, and a camera control unit (CCU) electrically coupled to the plurality of conductors at a proximal end. The CCU may include a body having a handle, one or more electronic circuits for controlling operation of components of the CCU, a display, and a display cover.

The CCU may further include a switching circuit configured to provide selective power control of the one or more electronic circuits responsive to an opening or closing of the display cover. The switching circuit may include a magnet disposed on or within the cover and a magnetic switch disposed on or within the CCU body. The switching circuit may include a magnet disposed on or within the CCU body and a magnet disposed on or within the CCU body. The switching circuit may include an electromechanical switch. The selective power control may consists of power control of only a portion of the elements of the CCU, such as to reduce power during times when the CCU is not in use (e.g., idle) or when functions such as displays, wireless links, processing elements, lighting elements, and/or other CCU or camera elements need not be powered up or may be operated in a reduced power state. For example, the portion of the elements of the CCU may include power control of an output display element, such as LCD panel or other visual or audible output device. The portion of the elements of the CCU may include power control of video or image signal processing elements of the CCU. The portion of the elements of the CCU may include power control of a sonde coupled to the CCU. The portion of the element of the CCU may include power control of a wireless communications module of the CCU.

The CCU may, for example, further includes dual-stepped USB ports or removable memory storage device ports disposed on or within the CCU body. The dual stepped USB ports may include two or more USB ports of the same type or different type.

The pipe inspection system may further include a folding kickstand assembly coupled to the CCU body. The folding kickstand assembly may include a kickstand. The folding kickstand assembly may further include a moveable handle. The CCU body may include a snap-in coupling mechanism to receive the moveable handle for storage in a retracted position. The cable reel or other pipe inspection system element may include a cradle or bracket for receiving the CCU handle in a stowed configuration. The cradle or bracket may include a self-attaching strap element for securing the handle to the cradle. The self-attaching strap element may be a Velcro or other hook and loop material.

The camera may further include, for example, a sonde. The camera may further include one or more lighting elements to illuminate areas being inspected. The camera or CCU may further include one or more sensors. The CCU may further include a smart battery interface module. The CCU may further include a smart battery coupled to the smart battery interface module.

The CCU may, for example, be configured to receive an image from the camera and depth information from a buried object locator based on signals emitted from a sonde and associate the depth information with the received image. The depth information may be displayed on a display of the CCU. The depth information may be overlaid on images or video streams provided from the camera. Location or position information, such as provided from GPS or other device, may be displayed on the display of the CCU. Location or position information may be overlaid on images or video streams provided from the camera. Depth information may be stored in association with the images or video, such as in the form of metadata. Location or position information may be stored in association with the images or video, such as in the form of metadata.

In another aspect, the disclosure relates to a cable-reel cradle to which a camera control unit can be readily attached for portability and easily released for use.

In another aspect, the disclosure relates to methods for operating a video pipe inspection system and associated elements such as CCUs, cameras, displays, and remote elements.

Various additional aspects, features, and functionality are further described below in conjunction with the appended Drawings.

The following exemplary embodiments are provided for the purpose of illustrating examples of various aspects, details, and functions of apparatus, methods, and systems for the inspection of pipes, conduits and the like. The described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Referring to FIG. 1A, details of an embodiment of a pipe inspection system 100A in use by an operator/technician 102 is illustrated. Inspection system 100A may include a cable reel 104, a camera control unit (CCU) 106A, a push-cable 108, including electrical conductors and mechanical structural support to facilitate being inserted and pushed through a pipe 110, and a camera 112, which may be equipped with analog and digital electronics for control and signal processing, one or more imaging sensors, optics, one or more light sources, such as LEDs, as well as other elements, such as a transmitting sonde for radiating electromagnetic fields for sensing and measurement by a corresponding locator (not shown). If a sonde is used, an associated locator can received emitted magnetic field signals and determine a depth of the sonde and corresponding pipe or cavity within which is it positioned and/or location or position information. An above-ground buried object locator may further receive GPS or other positioning signals to determine an absolute position or location, which may be associated with depth and/or other information determined from signals emitted by the sonde or by a buried object or cable. This information may then be communicated via a wired or wireless connection back to the CCU and/or other inspection system devices.

In operation, the camera 112 may be deployed by operator 102 down the pipe 110 using push-cable 108, and the interior of the pipe (or other cavity) may be viewed as a series of images from the camera's field of view and transmitted to a display element 114 of the CCU, such as an LCD or other visual display device. The CCU may be deployed in a standing configuration and the body of the unit may be supported on three supports and tilted, for ease of viewing and accessing controls.

Figure 1B:
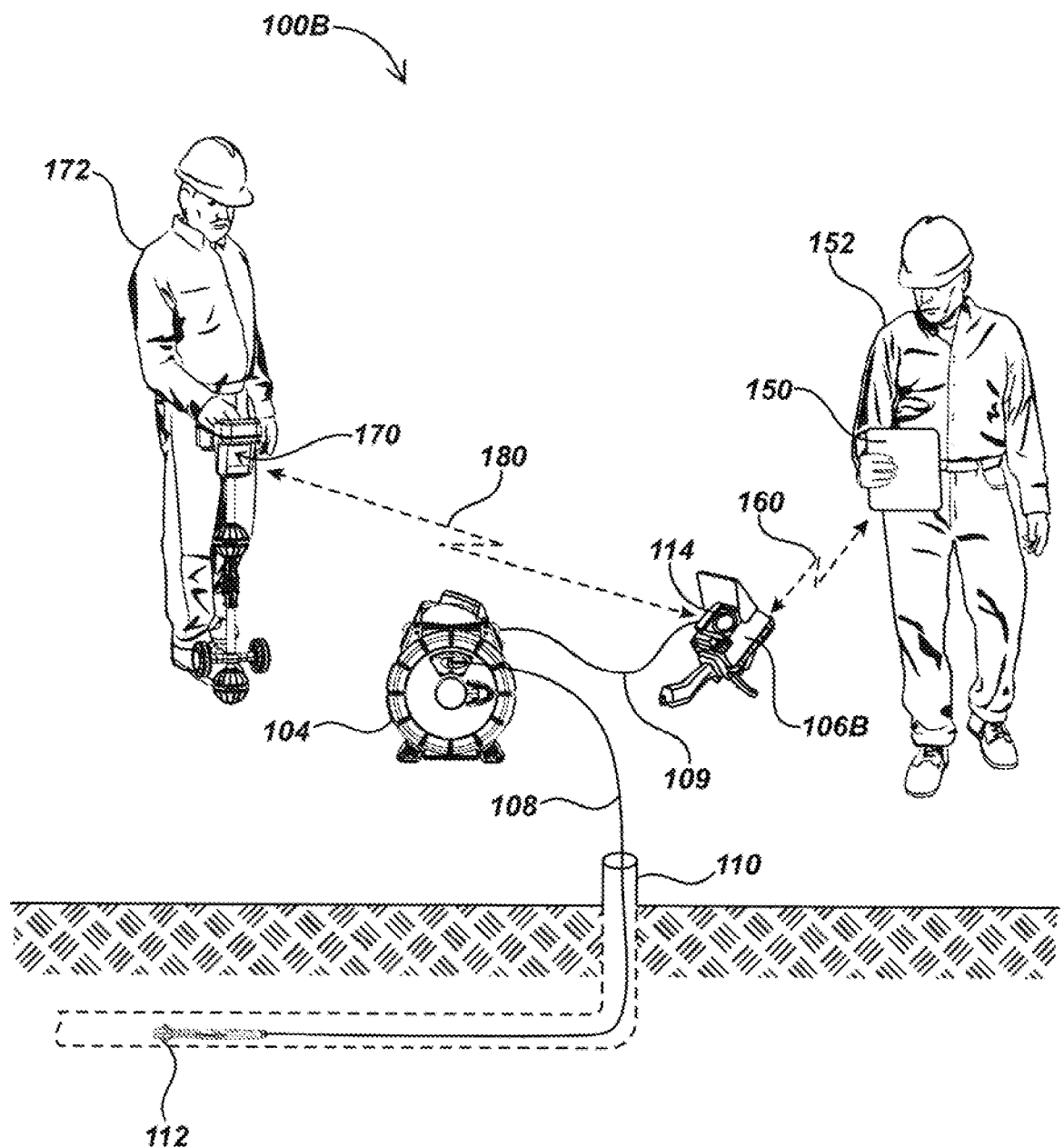
FIG. 1B illustrates an alternate embodiment with a local display/control device in wireless communication with a hand-held camera control unit (CCU).

FIG. 1B illustrates details of another embodiment of a pipe inspection system 100B, which may be configured similarly to system 100A but include an additional display/control device 150, which may be a notebook or other portable computer, a tablet device, smart phone, or other electronic computing device or system. Either a single user/operator (e.g., operator 172) or multiple users (e.g., additional operator 152) may perform inspection operations with this embodiment.

In the system of FIG. 1B, data and information may be sent via a wireless communication link 160 between the device 150 and CCU 106B, which may include a wireless communication module such as a Wi-Fi module, cellular data module, Bluetooth module, or other wireless communication transmitter or transceiver device. In some inspection operations, one user may have a buried object locator, such as locator 170 as shown, which may be in wireless communication with the CCU 106B via wireless communication link 180 (and/or via other communication links, such as a wired link (not shown), cellular or Wi-Fi network links, Bluetooth links, and the like).

When a locator such as locator 170 is used in conjunction with a camera having an include sonde (or a separate sonde deployed in the area being inspected), additional information may be reported from the locator to the CCU. For example, in FIG. 1B, camera 112 may include an integrated sonde which transmits magnetic field signals for sensing by locator 170. Locator 170 receives the magnetic field signals and determines an estimate of the depth of the camera 112. The locator may include a GPS module or other location or position sensing module to determine absolute location data. The locator may also include other sensors to provide physical or conditional sensing data. This information may then be reported to the CCU 106B via wireless link 180, and the depth data may be associated with captured images, video, location data, or other data or information, and/or may be displayed, stored in memory, and/or forwarded to other electronic computing systems. Images, video, and other data or information may also be stored on one or more removable memory devices plugged into the CCU 106A or 106B, such as USB thumb drives, flash cards, or other memory storage devices.

Transmitted data may include images or video streams from the camera and/or other data or information, such as sensor data, audio data, position/location data (e.g., from a GPS or other location sensing device in the CCU or cable reel) and the like. The other data or information may be integrated with the video or images, such as by being superimposed on images or video streams, or associated as metadata, or otherwise matched with the inspection results. In some embodiments, wired communication links (not shown) may be included in addition to or in place of wireless links, such as, for example, serial communication links, Ethernet links, optical communication links, and the like to communication images, video, and/or associated data or information.

Figure 2:
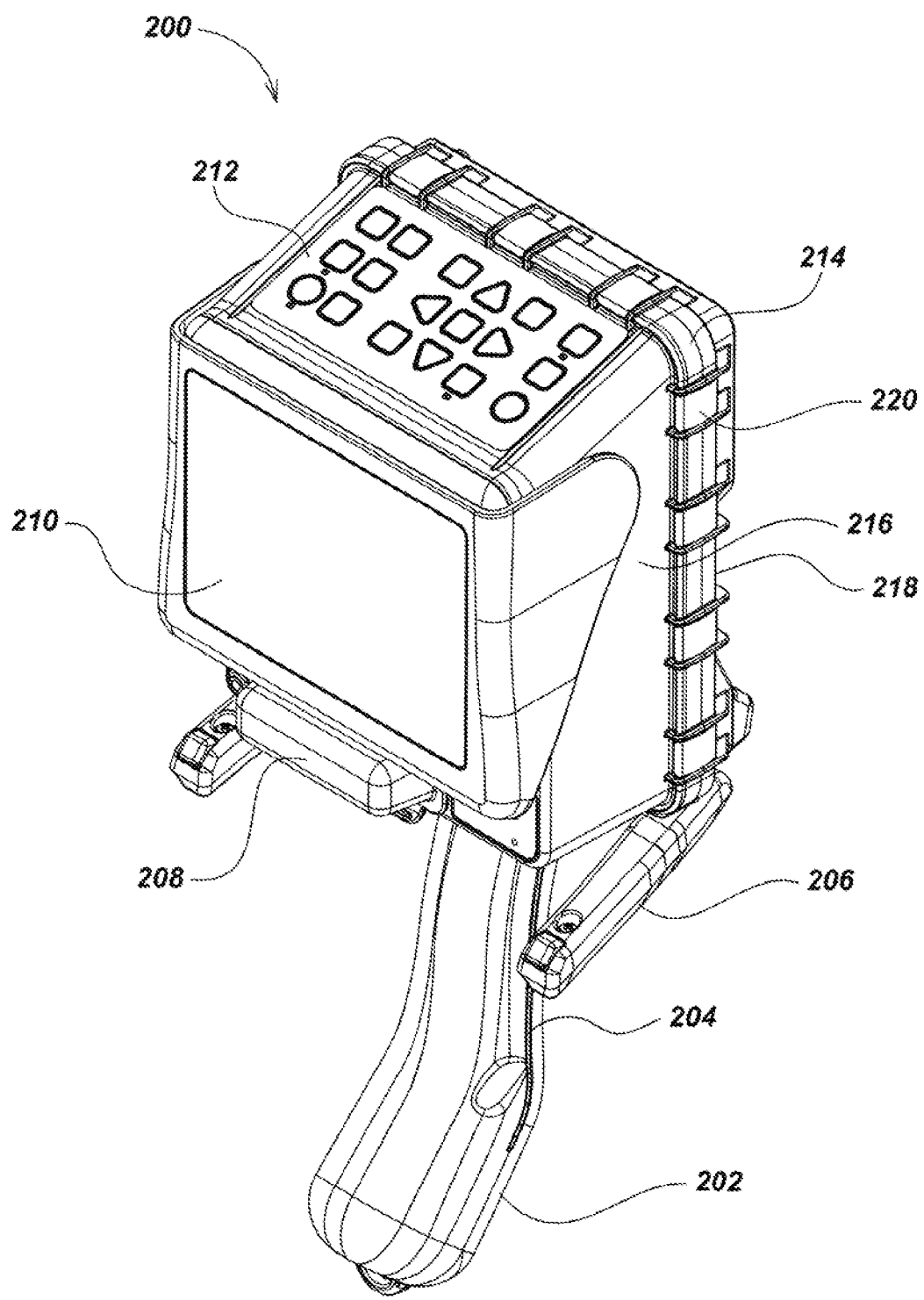
FIG. 2 is a perspective left front view of an exemplary embodiment of a hand-held camera control unit (CCU).

Referring to FIG. 2, details of an embodiment of a man-portable CCU 200 is illustrated in a portable carrying configuration. The CCU may include a body and handle to provide a user with a grip on the CCU during inspection operations when the CCU is not supported on the ground or other surface. The handle may be a formed molded handle such as handle 202 and may include an anti-slip insert 204 which may protrude slightly above the surface of the handle 202 to provide a better grip and prevent slippage of the user's grip. The handle 202 may be formed with grip-enhancing curves or indentations or other surface features aiding grip of the handle and CCU.

The CCU may include a kickstand assembly for providing support when the CCU is placed on the ground or other surfaces. For example, the kickstand assembly may include a handle or other leg structure and a rotating two-legged kickstand 206 that may be attached to the lower edge of the CCU 200 body by molded inserts, a hinge or other suitable attachment mechanisms, and may be rotated downward and forward to snap into a standing configuration, or rotated upward to snap into a hand-held configuration. Snaps or other attachment mechanisms may be included to allow the kickstand to snap or lock in place either during deployment or retraction. A movable handle, such as handle 202, may be used to provide three points of support or a tripod-type structure for the kickstand assembly, such as described with respect to FIG. 3.

The body of the CCU embodiment 200 may be fitted with a front connector cover 208 of flexible rubber or similar material providing a weatherproof protection for multiple electronic ports for the attachment of media or other devices such as, for example, USB thumbdrives, Bluetooth devices, WiFi units, or the like. The display screen 114 (FIG. 1) and front face of the body of the CCU 200 may be protected by a foldable sun hood or cover 210, which may be formed of durable plastic or similar material and attached to the body in such a way as it may be rotated upward to reveal a display screen 114 (FIG. 1). The interior of the CCU 200 body may include one or more electronic circuits including analog or digital electronics, processing elements, control elements, and other electrical, mechanical, optical, or other devices for providing camera control functions, image and video receipt, signal processing, display and storage functions, memory for data storage, wired and/or wireless communication links, and the like.

In one aspect, the upper surface of the CCU may support a membrane keypad 212 for user I/O, such as for receiving as input operator commands. A raised bumper 214 may be formed at the back edge of the body of the CCU by raised molding formed into the edge of the front case 216 and the edge of a rear cover 218. The molded edges of the front case 216 and the rear cover 218 may include mating surfaces where they meet when assembled, and may be locked together by a series of metal spring clips 220.

Figure 3:
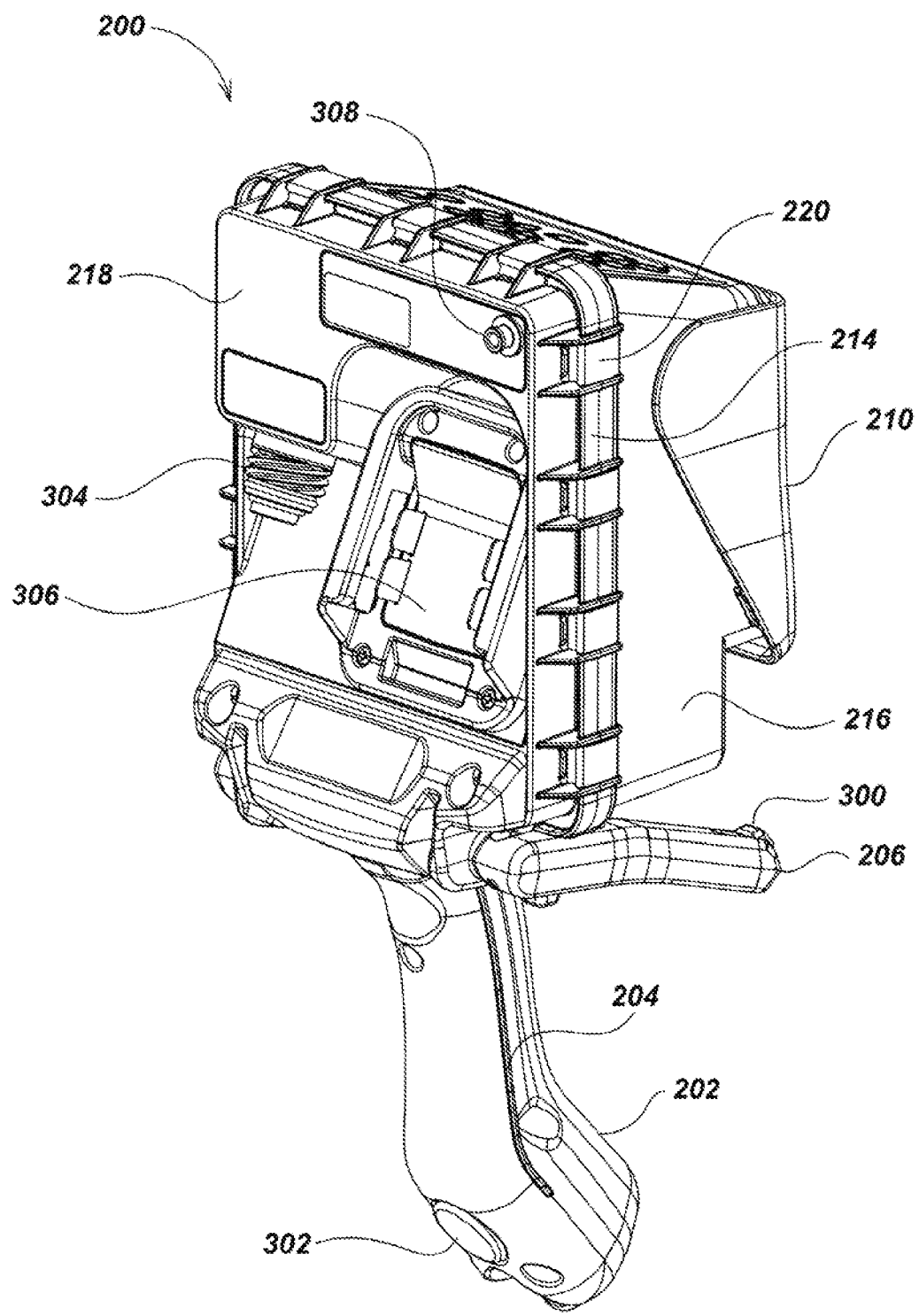
FIG. 3 is a perspective right rear view of the CCU in FIG. 2.

Turning to FIG. 3, a side view of the CCU embodiment 200 illustrates additional details. For example, the right side of the kickstand 206 may be rotated upward into its stowed, retracted, or hand-carrying configuration, which may be used for transportation and storage of the CCU and associated inspection system, or when the operator is carrying the CCU around by hand during an inspection. A rubber kickstand foot 300 may be attached at the end of each leg of the kickstand 206. A rubber bottom foot insert 302 may also be built into the bottom of the handle 202. Feet 300 and 302 may be used to provide stability, robust contact, and surface protection when the CCU 200 is deployed in the standing configuration.

In one aspect, a molded system connector 304 may provide connection to the system cable (not shown) which may electrically connect the pushcable (108 in FIG. 1) and connected camera (112 in FIG. 1) to the CCU 200 by way of the reel (104 in FIG. 1) in a typical system configuration. Other methods and devices used for electrical connection may be employed, such as, for example, a wireless connection, for the relay of images, video signals, data, or other information. A battery receiver 306 may be used for the attachment of a rechargeable replaceable battery (not shown) for providing power to the CCU 200. The battery may be, for example, an intelligent or "Lucid" battery such as described in co-assigned U.S. patent application Ser. No. 13/532,721, filed Jun. 25, 2012, entitled MODULAR BATTERY PACK APPARATUS, SYSTEMS, AND METHODS, the content of which is incorporated by reference herein in its entirety. CCUs in accordance with aspects described herein may further include intelligent battery functionality as described in the '721 application and/or may be coupled to intelligent batteries as described therein to provide additional battery monitoring functionality as well as viral data transfer and other dockable battery functionality.

The angle of the battery receiver 306 may provide an efficient distribution of weight for the CCU 200 in use. In one aspect, a line-trace lug 308 may be provided on the rear outer surface of the CCU 200, which may be used by an operator to connect a standard line transmitter to the CCU 200 and energize the push-cable 108 (FIG. 1) for line-tracing the path of the pushcable 108 (FIG. 1) within the pipe 110 (FIG. 1) using a standard locating receiver (not shown), such as those described in the locator applications incorporated herein.

Figure 4:
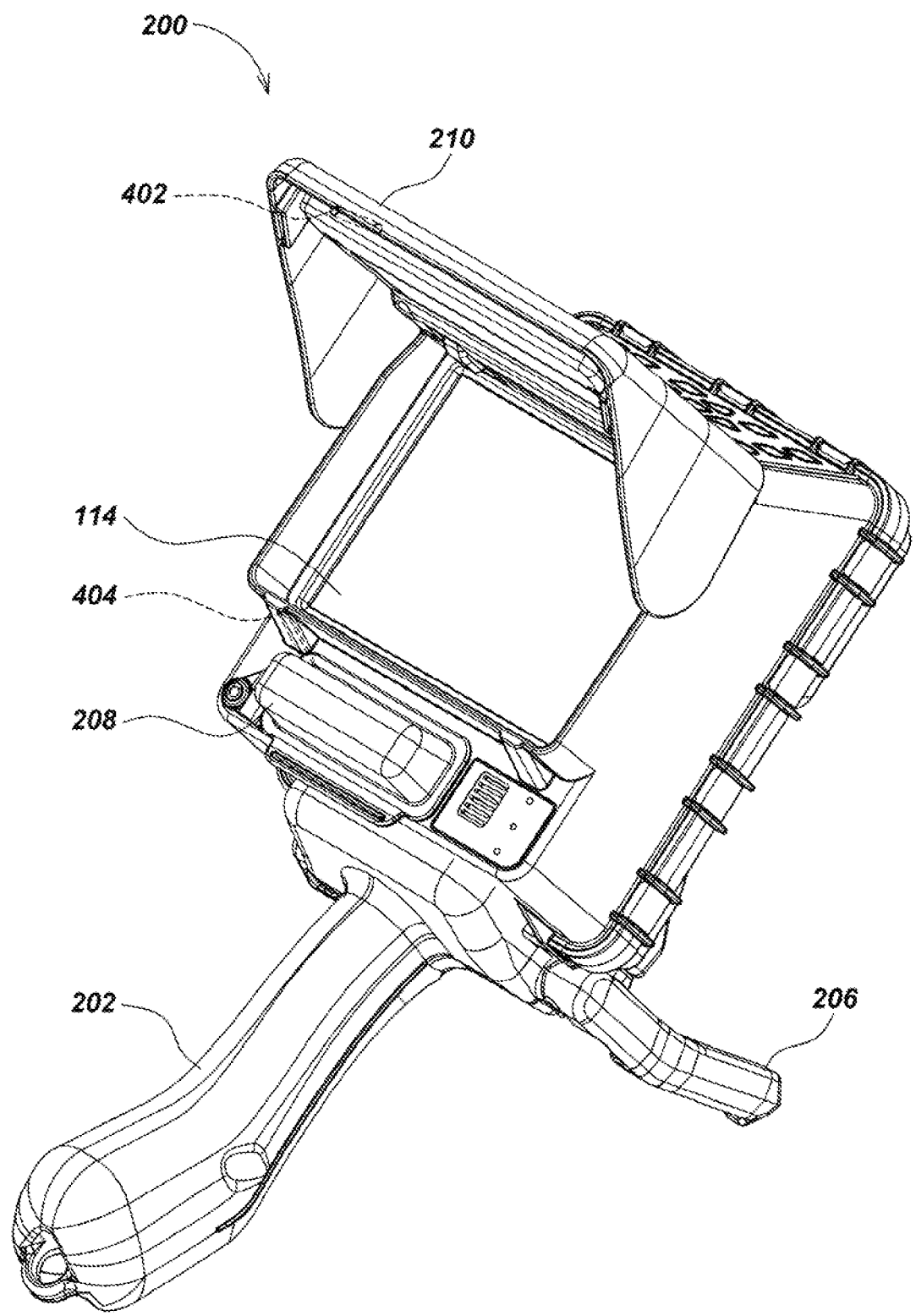
FIG. 4 is a perspective left front view of the CCU in its standing configuration.

Turning to FIG. 4, additional details of the CCU embodiment 200 in its standing configuration is illustrated. During certain operations, the sun hood or cover 210 may be raised to deflect sunlight and increase display 114 (FIG. 1) visibility, such as under daytime conditions. The cover may be coupled to a switching circuit that provides a signal to electronic circuits within the CCU. For example, a processing element of the CCU may receive a switched signal indicating that the CCU cover has been closed, which may then be used to selectively control power to components of the CCU and/or associated devices, such as cameras, sondes, etc. In one scenario, power to circuit component circuits of the CCU may be powered down when the cover is closed, such as LCD display circuits, camera power, or other circuits that are not needed when the CCU is in a "paused" or "inactive" mode. Alternately, or in addition, power may be reduced when the cover is closed or opened, depending on the particular conditions. For example, the switching circuit may be configured so that a fully opened cover represents lower ambient light and therefore LCD display power or other lighting may be turned down. Conversely, if the cover is partially closed (e.g., in a hooded state as in FIG. 4) higher power may be provided to LCD displays or other circuits to overcome high ambient lighting conditions.

When the CCU is positioned on the ground or other surfaces, the kickstand 206 may be rotated back as shown in FIG. 4 to support the unit on a working surface or on the ground in such a way as to angle the display screen toward the user for convenient viewing and access to controls. The handle 202 may be used as a third leg of a tripodal support in conjunction with the kickstand 206. An embedded magnet 402 may serve to trigger an embedded sensor switch 404 when the sun hood 210 may be closed or opened. Such a trigger may be used, for example, to initiate a start-up of the system when the sun hood 210 is opened, and may cause the system to sleep or shut down when the sun hood 210 is closed, or the like. The switch need not have only 2 positions, but rather may include multiple outputs depending on a relative position of the hood or cover. For example, when the cover is fully opened it may be assumed that the required power is at a maximum, such as for the display, whereas when the cover is partially closed it may be assumed that the power requirement is lower, and therefore output power to the display or other components may be reduced. If the hood is closed, the CCU may be placed into a standby state, where only core functions remain powered up. For example, if an external display device is coupled, such as via a wireless link, to the CCU, power to the display may be turned off and only electronic components required for receiving video or images and wirelessly transmitting them to the other display may be powered on.

Figure 5:
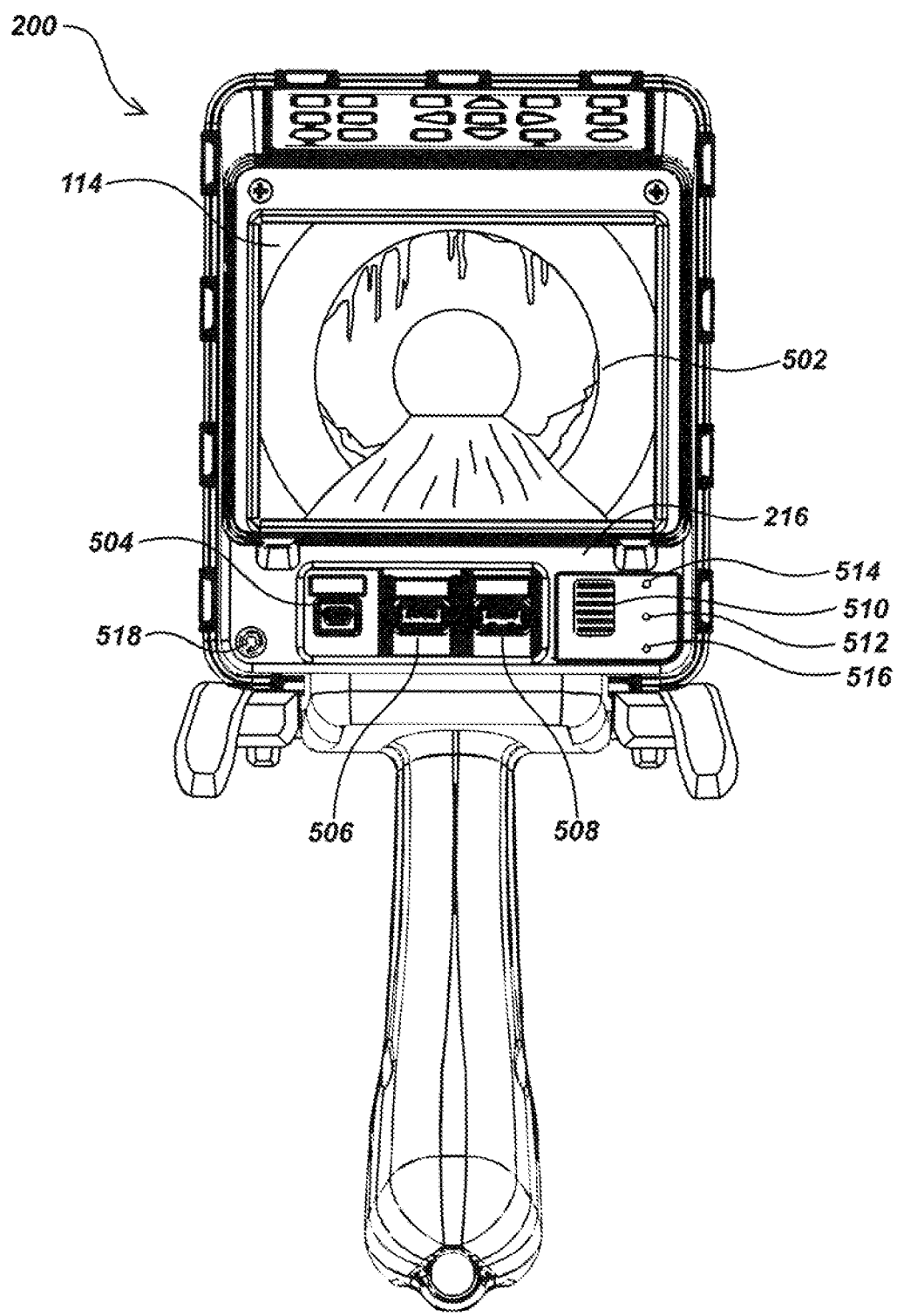
FIG. 5 is a front view of the CCU in FIG. 2 with the front connector cover removed revealing the USB ports.

Turning to FIG. 5, the CCU embodiment 200 is shown with the sun hood (210 in FIG. 2) and the front connector cover (208 in FIG. 2) removed for ease of illustration only. The display screen 114 presents an image 502 of the interior of a pipe (110 in FIG. 1) under inspection as seen by the camera (112 in FIG. 1). A speaker 510 or other audio output device or headphone jack or connector may be built into the front face for use when playing back a voice recording. To secure the front connector cover (208 in FIG. 2) to the front case 216, a snap-foot pin 518 may be seated in a matching hole in the front case 216. An elastic opening in the front connector cover (208 in FIG. 2) may be fitted securely to the snap-foot pin 518.

Still referring to FIG. 5, a mini-A USB port 504 may be disposed under the front connector cover (208 in FIG. 2). Other connectors such as standard USB port-1 506 and standard USB port-2 508 may also be disposed under the front connector cover (208 in FIG. 2).

In accordance with one aspect, USB or other removable memory ports may be disposed in a stepped-orientation on or within the CCU body. For example, in a dual-stepped configuration the central USB port-1 506 may be recessed to a greater depth than the mini-USB port 504 and the standard USB port-2 508, providing the advantage of allowing a larger removable USB drive to be inserted without interfering with the protection provided by the front connector cover (208 in FIG. 2). Other stepped removable memory connectors and associated circuitry and mechanical interfaces may be used in various embodiments to allow for various sizes and/or shapes of removable memory devices without interfering with CCU operation. In one aspect, a high-capacity drive with a larger physical footprint may be left in the CCU 200 for extended periods for storing recordings and other inspection data. Small drives in the deeper drive pocket may be less easy to reach and remove.

A microphone 512 or microphone jack or other audio connector, such as a digital audio interface or USB connector, may be situated on the front face of the CCU 200 to support voice annotation of captured images or video clips. A USB LED 514 may be provided to indicate the state of activity of the USB drives. The front face of the CCU may also be provided with a light sensor 516 to support automated brightening of the display when ambient light is reduced.

Figure 6:
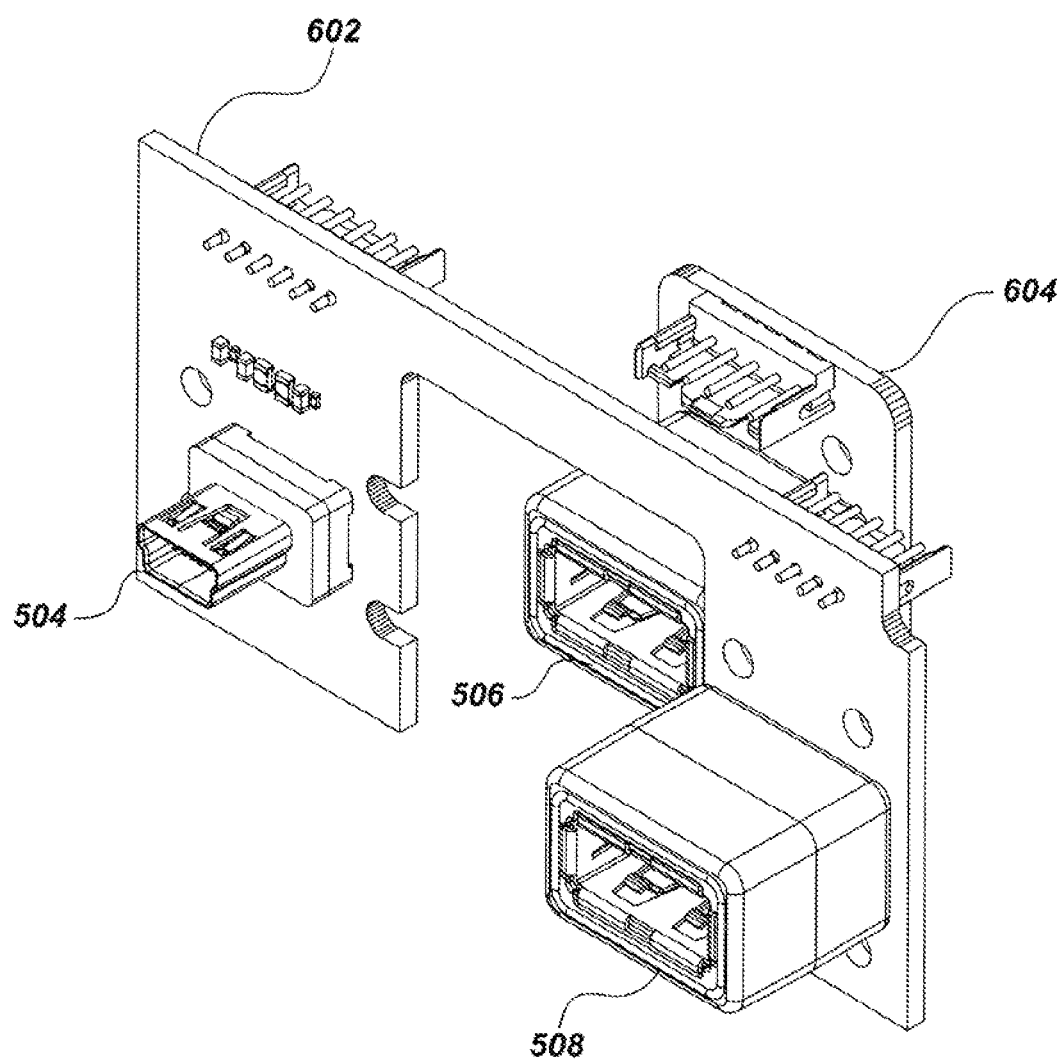
FIGS. 6 and 7 illustrate the positioning of the USB ports in FIG. 5.
Figure 7:
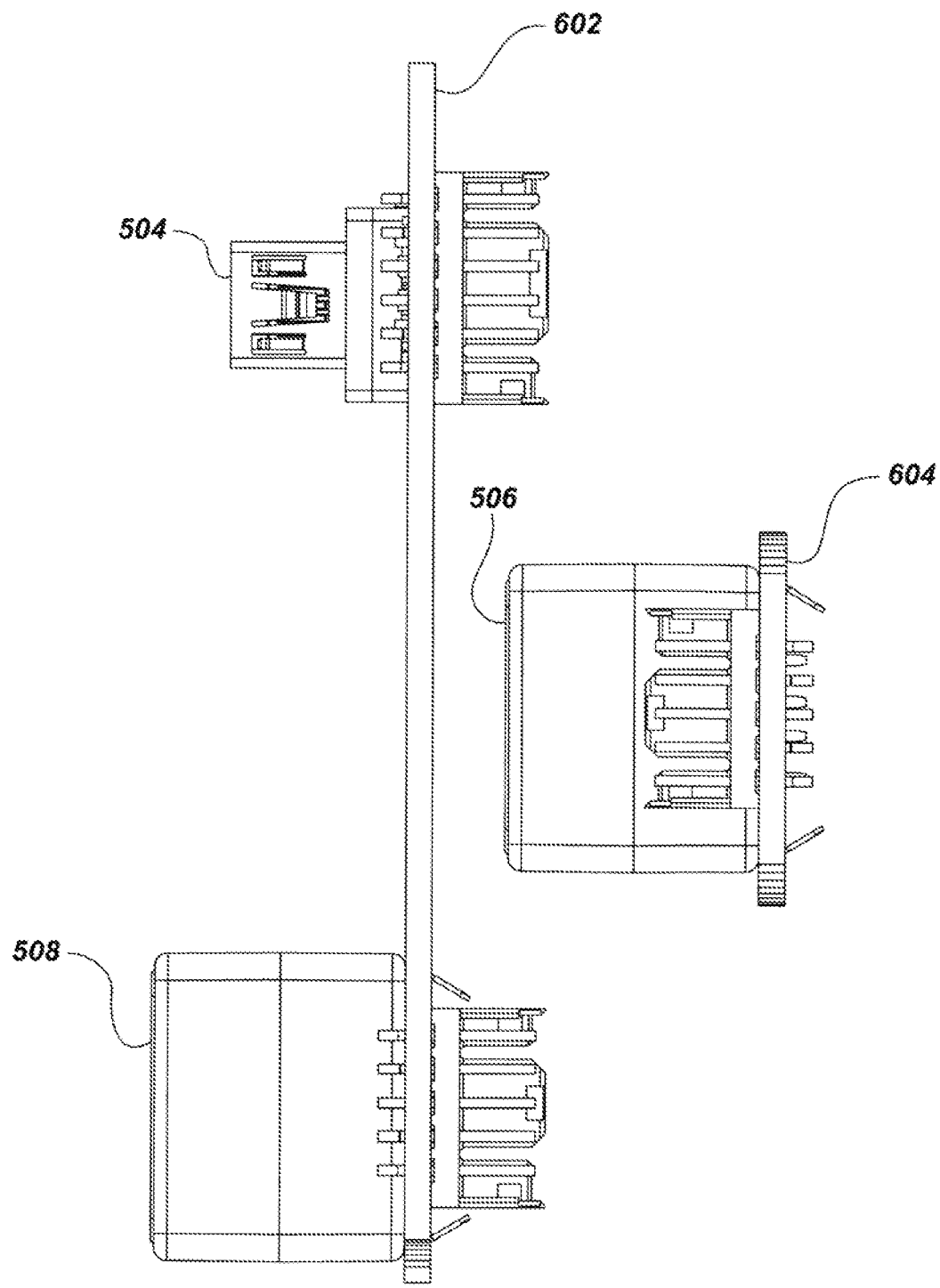

Turning to FIG. 6, one embodiment of a two-level or dual-stepped USB port configuration is illustrated. In one aspect, one or more electronic circuit boards, such as a circuit board 602 and a circuit board 604, may be configured together. In an exemplary embodiment, the mini-USB port 504 and the standard USB port-2 508 may be mounted on circuit board 602, while the standard USB port-1 506 may be mounted on circuit board 604, which may be set back to provide a deeper clearance for the protruding section of a larger USB device, thereby allowing for insertion of different sizes of USB devices for different memory storage functions. Both circuit boards may be attached to the CCU housing with one or more fasteners, such as plastite screws or other similar fastening mechanisms. FIG. 7 illustrates a corresponding side view of the dual-stepped USB port embodiment of FIG. 6. Additional details of stepped USB port configurations and other camera controller elements that may be used in embodiments in conjunction with the disclosures herein are described in co-assigned U.S. patent application Ser. No. 61/671,644, filed Jul. 13, 2012, entitled SELF-GROUNDING TRANSMITTER PORTABLE CAMERA CONTROLLER FOR USE WITH PIPE INSPECTION SYSTEM, the content of which is incorporated by reference herein.

Figure 8:
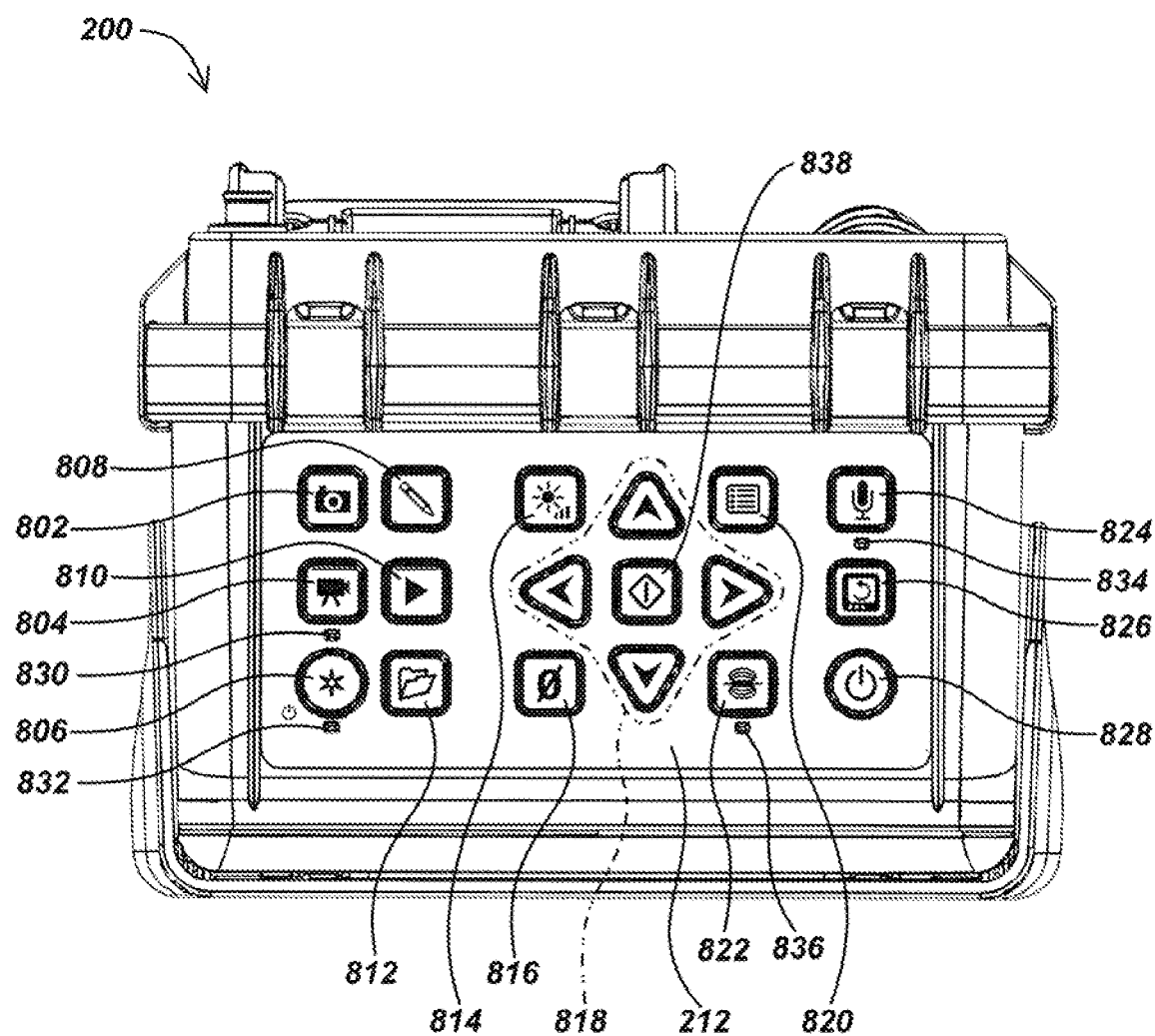
FIG. 8 is top view of the CCU in FIG. 2 showing the control keypad.

Referring to FIG. 8, a top-down view of the CCU 200 is illustrated. CCU 200 may include a control panel and the individual press-switches of the membrane keypad 212. Functions provided by the keypad may be allocated to the individual press-switches as indicated by one or more corresponding icons. Functions associated with keypresses of the illustrated keys (or other keys) may be implemented in a processing element of the CCU to provide the corresponding functionality to the CCU, cameras, or other coupled devices or systems.

In one aspect, a photo key 802 may trigger the system 100 (FIG. 1) to capture a snapshot of the present camera view when pressed. In one aspect, a video Key 804 may start and stop video recording when pressed.

In an exemplary embodiment, an auto-logging key 806 starts and stops the capture of a series of timed still images of the camera view accompanied by audio from the system microphone. It may also turn the unit on in an Autolog mode.

In one aspect, a photo tag key 808 may capture a snapshot of the camera's field of view and open an editing screen enabling annotation of the photo with text comments.

A job review key 810 may open a review screen for reviewing captured video, snapshots, or audio elements or allows notation to be added to video.

A job manager key 812 may open a menu allowing the generation of reports, a listing of existing report files on a USB drive, and ejection of a USB device from the USB ports.

An LED brightness key 814 may allow adjustment of the illumination LEDs on the camera head.

A zero key 816 allows an operator to reset the zero-point or set a relative zero-point for the cable distance counter built into the reel (104 in FIG. 1) or to cancel the use of a relative zero point.

One or more keys, such as arrow keys 818 may be used to traverse menus and screens provided on the display. A select key 838 is used to activate a selection in a menu.

A menu key 820 may provide user access to configuration choices.

A sonde key 822 may be used to start and stop operation of the Sonde transmitter built into some pipe-inspection cameras.

A microphone key 824 may turn the built-in microphone on or off for use in recording descriptive commentary.

An image flip key 826 may flip the vertical orientation of the screen image while mirroring the screen image horizontally for use when the camera has been rotated within a pipe.

A power key 828 may be used to initialize the system and may power the system up or down.

A red video LED 830 may be disposed under the video key 804 to indicate the state of video capture in progress. A similar red autolog LED 832 may be provided under the autolog key 806 to indicate that autologging may be in progress. An amber microphone LED 834 may be provided under the microphone key 824 to indicate when audio recording may be in progress. A green Sonde LED 836 may be provided under the Sonde Key 822 to indicate the state of the Sonde when transmitting or off.

Other functions and allocations to a user-interface device may be used as design requires. In an alternative embodiment, for example, user control may be voice-activated, or other kinds of switching devices may be used. A GPS antenna and receiver module (not shown) may be disposed inside the body of the CCU 200, which may used to enable the system to add GPS locations to reports generated by the unit's software. In some embodiments, a dual antenna GPS system, such as described in co-assigned U.S. patent application Ser. No. 61/618,746, filed on Mar. 31, 2012, entitled DUAL ANTENNA SYSTEMS WITH VARIBLE POLARIZATION, which is incorporated by reference herein in its entirety, may be used to provide enhanced location information.

Figure 9:
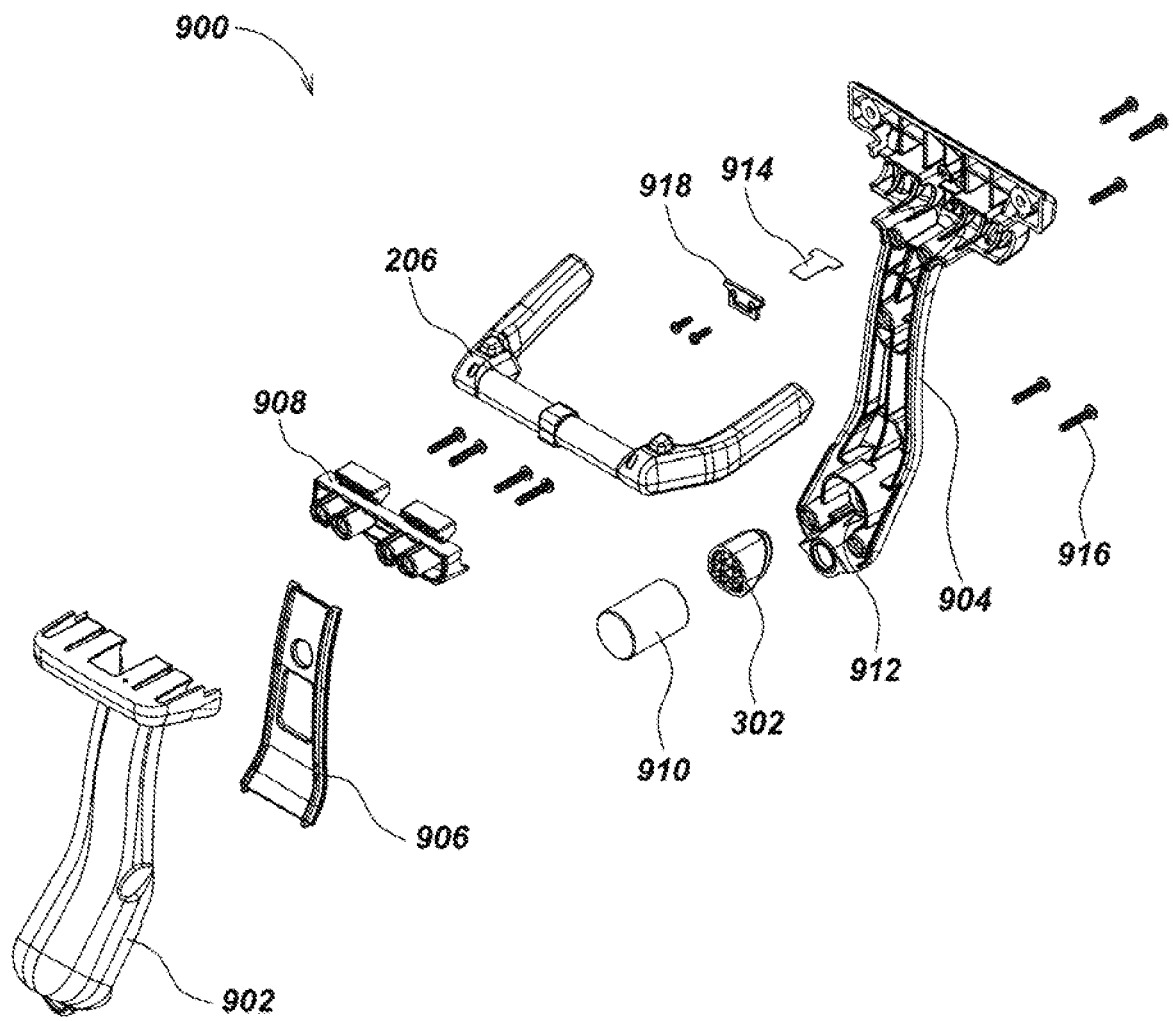
FIG. 9 is an exploded view of the CCU' s handle components.

Referring to FIG. 9, the detailed construction of an exemplary handle is illustrated. In an exemplary embodiment, a handle assembly 900 may include a molded handle top 902 and a molded handle bottom 904 with a handle insert 906 which fits between the handle top 902 and the handle bottom 904. The insert may be dimensioned such that it protrudes above the surface of the handle and may provide a frictional surface to improve the grip of a user. The handle top 902 and the handle bottom 904 may capture and secure a kickstand clamp 908 and the assembly may be fastened with screws 916, such as #4 20×375 Phillips-head Plastite screws or other compatible fasteners. In the lower segment of the handle assembly 900, a cylindrical weight 910, which may be constructed of brass, steel, lead or any suitable material may be inserted into a matching recess 912 molded into the handle bottom 904, and backed by a molded foot insert 302, for the purpose of adding stability to the CCU 200 (FIG. 2) when in use. The kickstand 206 may be engaged with a snap spring 914 and may be captured and retained by a locking piece 918.

When the system is deployed (FIG. 1), the CCU 200 may be used in conjunction with cable reel 104 (FIG. 1). Reel 104 may be fitted with a docking handle to accommodate a man-portable CCU to facilitate transport and/or storage.

Figure 10:
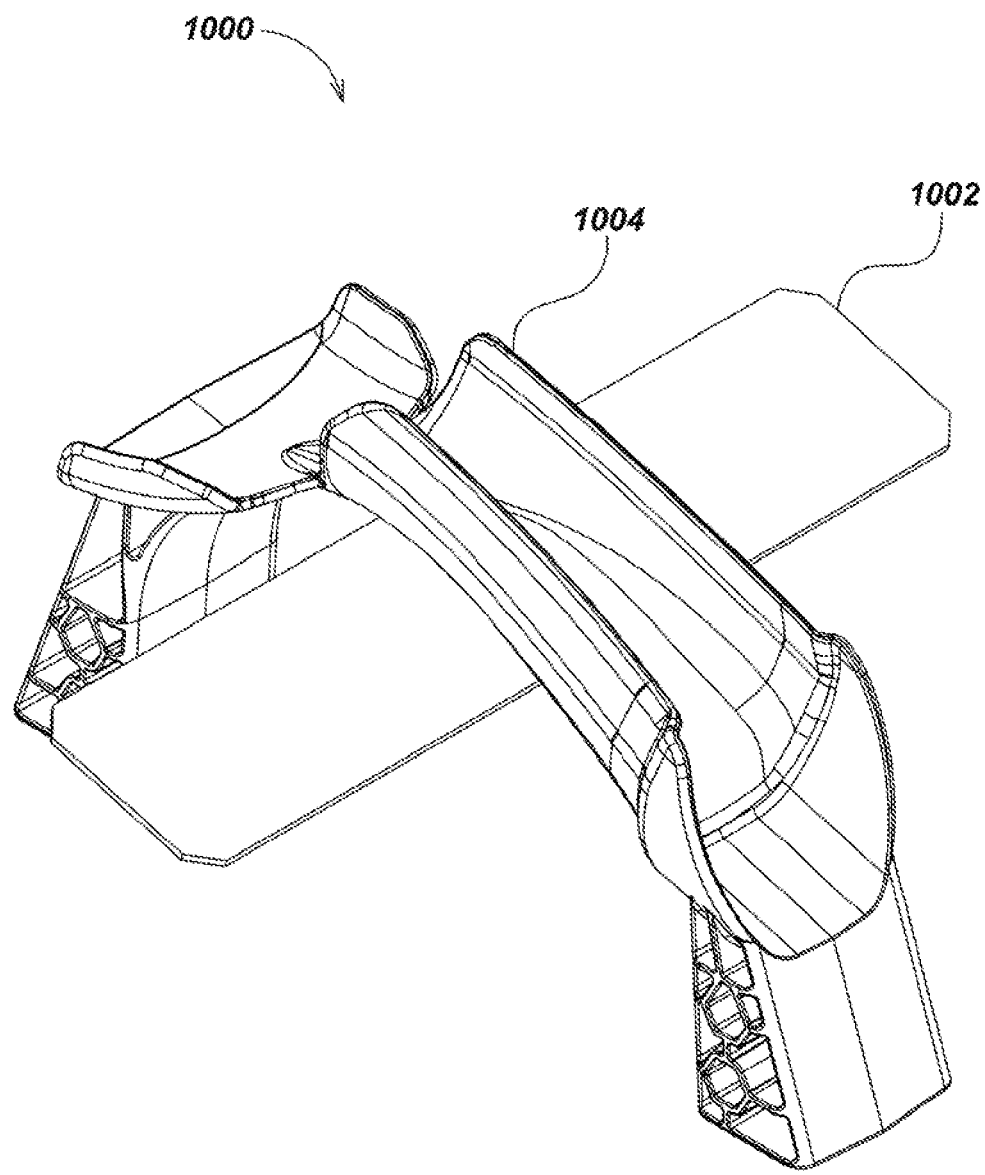
FIG. 10 is a perspective view of the purpose-designed docking handle with self-attaching closure used for attaching the CCU to a pipe-inspection system reel.

Turning to FIG. 10, details of a docking handle 1000 is illustrated. In an exemplary embodiment, docking handle may be attached to a corresponding reel, such as cable reel 104. The molded docking handle 1000 may be formed of two molded halves. A self-attaching material strap or band or clip, such as a Velcro® hook and loop band 1002 or other self-attaching band or strap or clip mechanism, may be attached to the underside of the formed handle cradle 1004 such that when the CCU 200 (FIG. 2) is laid into the handle cradle 1004, it may engage into the handle cradle 1004. This may be done by engaging a coupling sized for a snap fit based on, for example, formed edges of the handle cradle 1004, which may then be secured by wrapping the Velcro® band 1002 around the CCU handle from either side and fixing the Velcro® band 1002 to itself, or otherwise self-attaching the band or strap to secure the handle.

Figure 11:
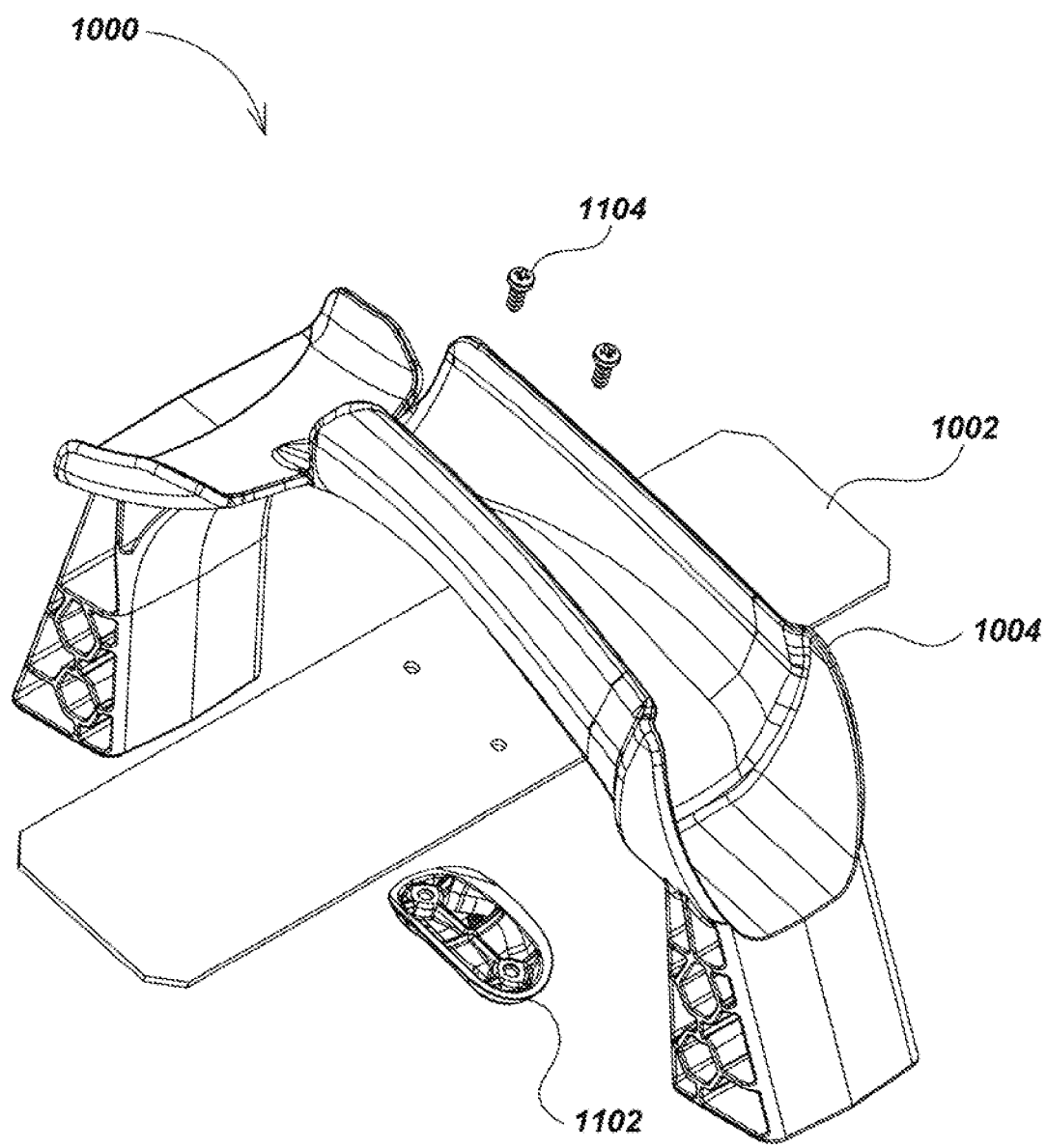
FIG. 11 is an exploded view of the docking handle components.

Turning to FIG. 11, the construction of one exemplary docking handle embodiment 1000 is illustrated. The Velcro band 1002 may be secured to the underside of the handle cradle 1004 by one or more screws such as screws 1104, which may pass through pre-drilled holes in the handle cradle 1004 and the Velcro band 1002, and may be seated into threaded openings in a molded base 1102 designed to fit into the curve of the underside of the handle cradle 1004.

Figure 12:
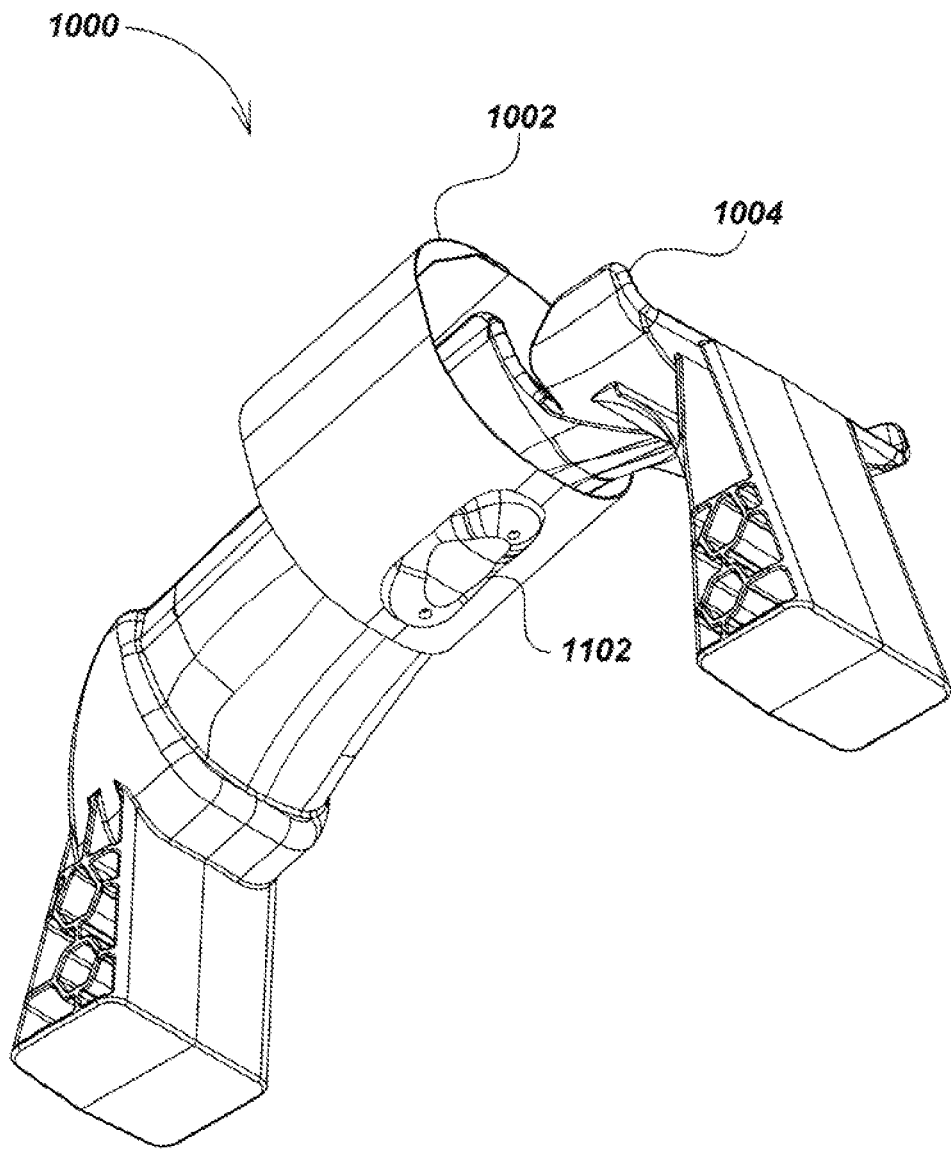
FIG. 12 is a bottom-up view of the docking handle.

Turning to FIG. 12, the underside of docking handle 1000 is illustrated. In one aspect, the molded base 1102 may be secured, and the Velcro band 1002 may be fastened around the handle cradle 1004.

Figure 13:
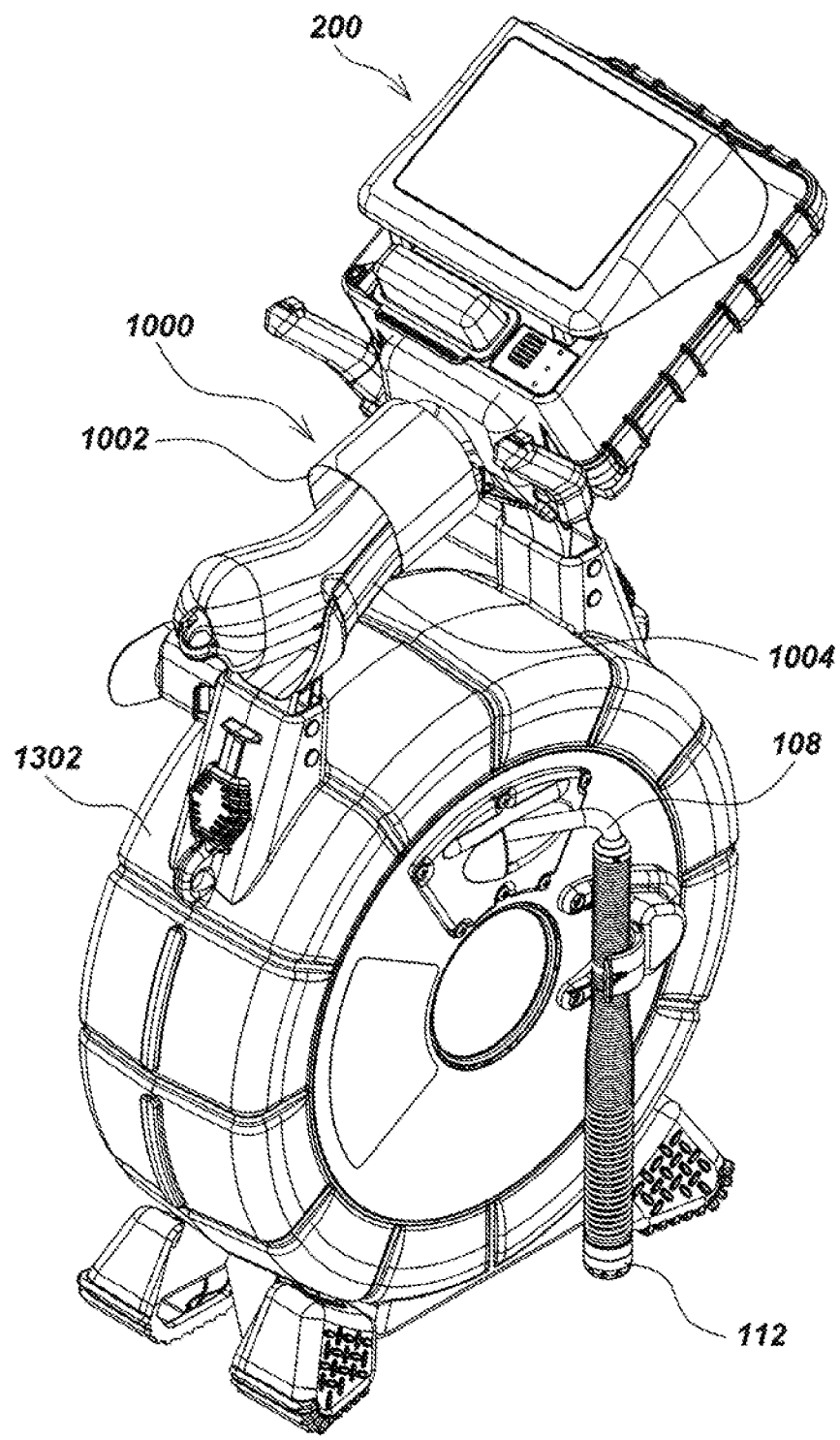
FIG. 13 is a perspective view of the CCU installed in a docking handle attached to a pipe-inspection reel.

Turning to FIG. 13, an exemplary embodiment of the docking handle 1000 may be mounted on a typical pipe-inspection reel 1302 (or on other reels or associated components in alternate embodiments). Camera 112, disposed at the end of the pushcable 108, may be temporarily clipped to the outside of the pipe-inspection reel 1302 for ease of transport.

Figure 14:
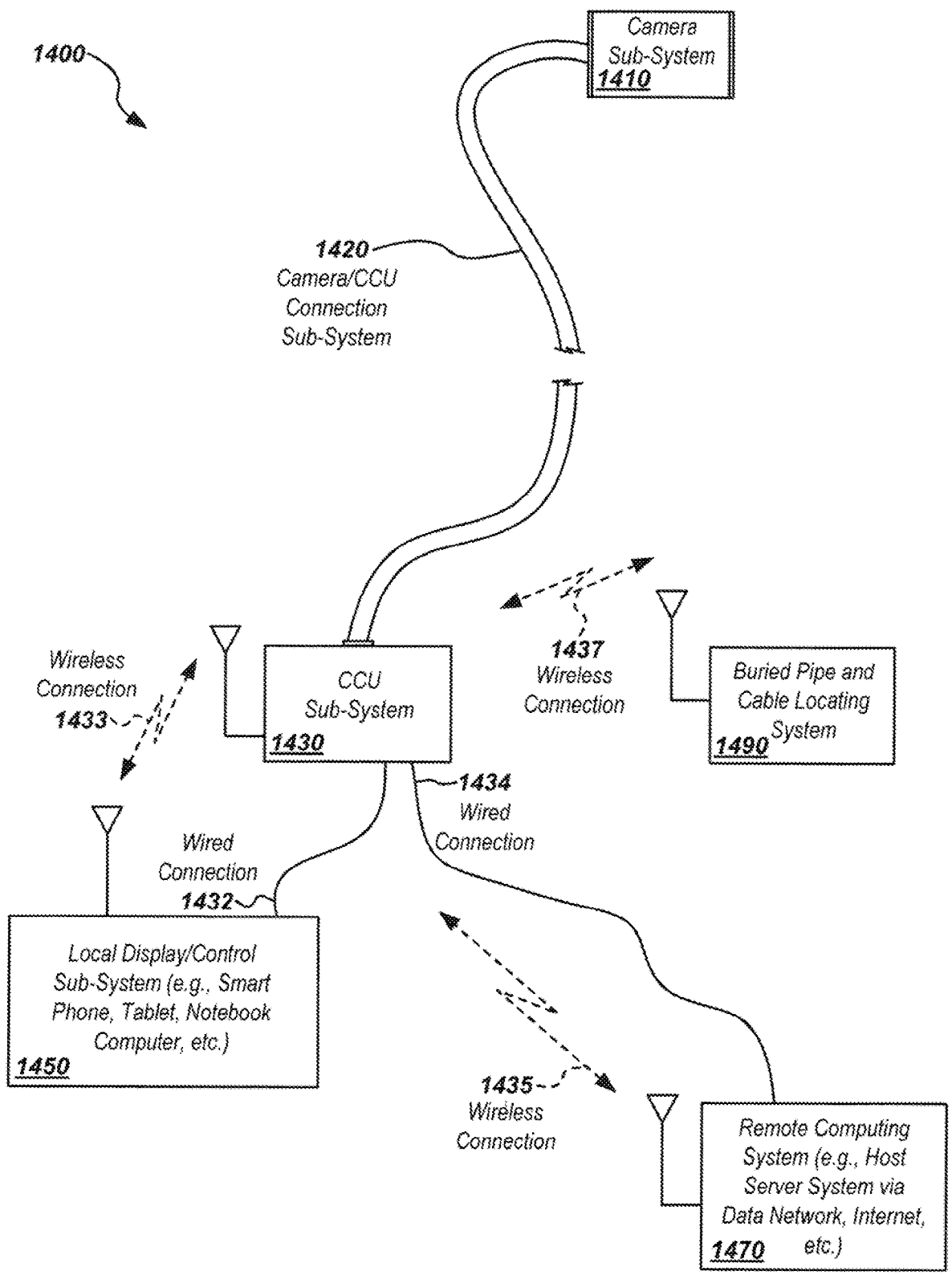
FIG. 14 illustrates details of an embodiment of an inspection system including optional local and/or remote system elements and buried object locators.

FIG. 14 illustrates additional details of an embodiment of a pipe inspection system 1400 in accordance with additional aspects. System 1400 may correspond with system 100A of FIG. 1A and/or system 100B of FIG. 1B. As shown in FIG. 14, inspection system 1400 may include a camera sub-system 1410, a camera/CCU connection sub-system 1420 electrically coupling the camera sub-system 1410 to a CCU sub-system 1430, one or more local display/control sub-systems 1450, which may be coupled to the CCU sub-system 1430 by wired and/or wireless connections 1434, 1435, and/or a remote computing system 1470 and associated wired and/or wireless communication connections 1434. Connection sub-system 1420 may include one or more electrical or optical conductors along with a mechanical push-cable structure for deploying the camera sub-system 1410 within the pipe or other cavity being inspected.

Remote system 1470 may include computer host or server systems, databases, storage systems, display systems, and the like to collect, process, store, and/or distribute collected camera images, video, audio, and/or associated data, such as location data, sensor data, operator annotations, and the like. Remote system 1470 may be coupled to the on-site inspection system and CCU sub-system 1430 via wired or wireless connections, such as cellular data, Ethernet, satellite or terrestrial communication links, Internet backbone connections, as well as to other devices such as hidden or buried object, cable, or pipe locator devices or systems, buried object locator transmitters, and the like.

Local display/control sub-system 1450 may be coupled to the CCU via wired and/or wireless connections 1432, 1433 and may include hardware, software, and peripheral user interfaces to allow an operator to control camera deployment and orientation, image/video capture, display and store captured images and video, audio, sensor data, location or position data, sonde data, and the like. Local display/control sub-system 1450 may further include software for remotely controlling camera deployment and operation, such as provide a remote-control function to the CCU sub-system 1430 to allow operation via a second user and/or a remote location relative to the CCU. Additional details of embodiments of the camera sub-system 1410 and CCU sub-system 1430 are further illustrated in FIG. 15 and FIG. 16.

Figure 15:
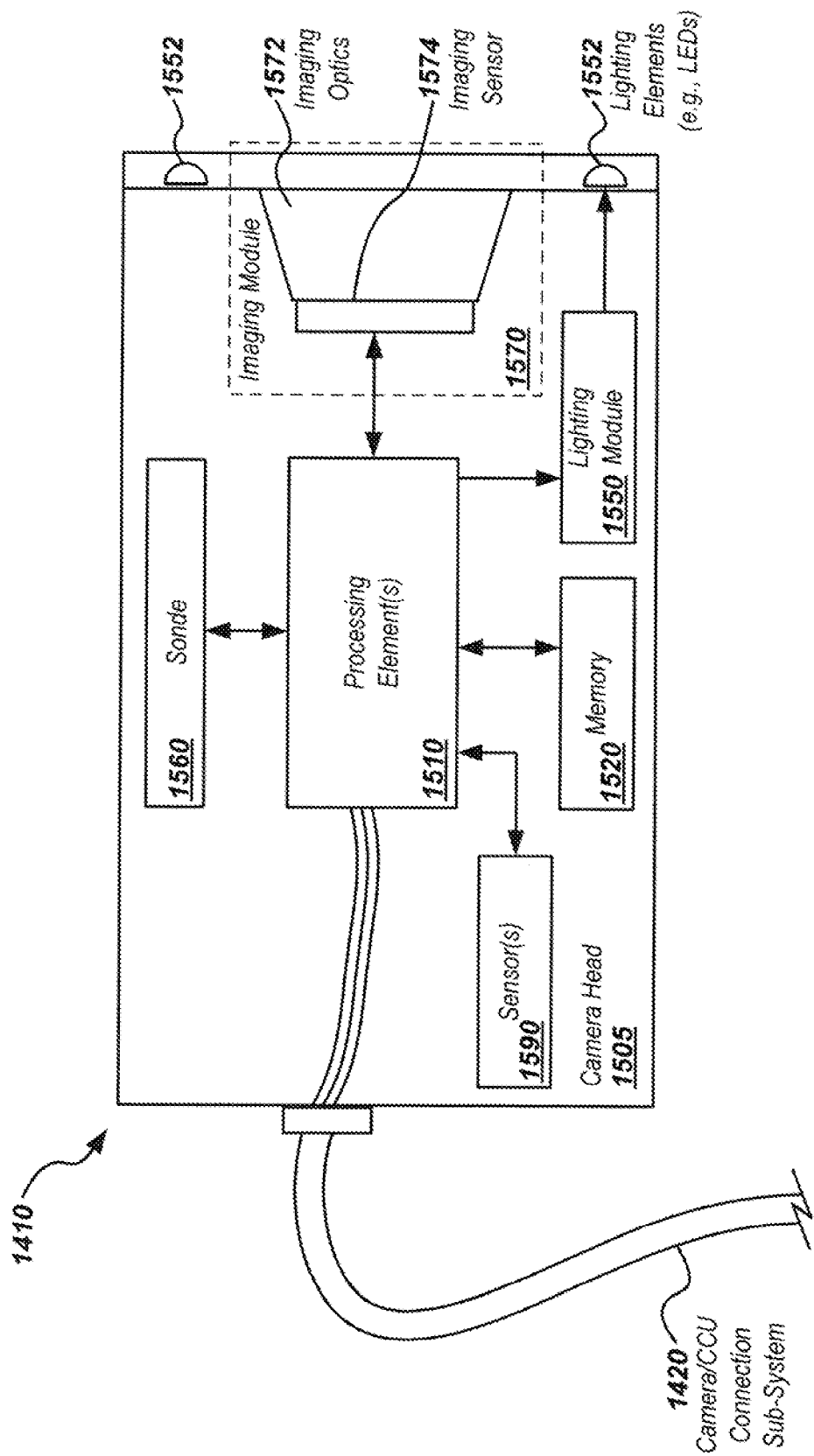
FIG. 15 illustrates details of an embodiment of a camera head as may be used in the systems of FIGS. 1A and 1B and FIG. 14.

Turning to FIG. 15, one embodiment of a camera sub-system 1410 is illustrated. As shown in FIG. 15, camera 1410 may include a camera head body 1505 for enclosing one or more electronic circuits including one or more processing elements 1510, one or more memories 1520 coupled to the processing elements for storing data and/or processor instructions for implementing camera control, image and video capture, and/or signal processing functions, as well as a lighting module 1550 for generating and providing lighting control signals and/or power to drive lighting elements, such as LED lights 1552, to illuminate areas under inspection. Control signals may be provided via connection sub-system 1420 from the CCU to control operation of the camera head and associated functions such as image or video capture, area being viewed, lighting, pan/tilt functions, and the like.

The camera head may include an imaging module or modules 1570 including one or more image sensors 1574, such as CMOS, CCD, or other imaging sensor devices for capturing images and/or video streams of areas being viewed by the camera, along with imaging optics 1572 and related electronic and mechanical/optical components for defining the field of view. The camera head may further include other elements such as a sonde 1560 to generate magnetic field signals for use by a buried object locator to determine camera head location or depth. In addition, the camera head may include or be coupled to sensor(s) 1590, such as, for example, inertial sensors such as accelerometers to detect acceleration, tilt, shock, vibration, and the like, compass sensors, gyroscopic sensors, gravitational orientation sensors, motion sensors, physical parameter sensors such as temperature sensors, moisture sensors, humidity sensors, pressure or barometeric sensors, gas or liquid sensors, microphones or other acoustic sensors, electromagnetic field sensors, one or more axis geophones, and/or other sensing devices.

Additional details of various embodiments of camera heads, CCUs, and image control, capture, and signal processing elements and functions as may be used in inspection system embodiments including cameras and CCUs in conjunction with the disclosures herein are described in co-assigned patent applications including U.S. patent application Ser. No. 13/754,767, filed Jan. 30, 2013, entitled ADJUSTABLE VARIABLE RESOLUTION INSPECTION SYSTEMS AND METHODS, U.S. Provisional Patent Application Ser. No. 61/764,474, filed Feb. 13, 2013, entitled OPTICAL GROUND TRACKING APPARATUS, SYSTEMS, AND METHODS, U.S. patent application Ser. No. 10/858,628, filed Jun. 1, 2004, entitled SELF-LEVELING CAMERA, U.S. patent application Ser. No. 12/715,684, filed Mar. 2, 2010, entitled METHOD AND APPARATUS FOR HIGH-SPEED DATA TRANSFER EMPLOYING SELF-SYNCHRONIZING QUADRATURE AMPLITUDE MODULE, U.S. patent application Ser. No. 13/609,196, filed Sep. 10, 2012, entitled SYSTEMS AND METHODS FOR DATA TRANSFER EMPLOYING SELF-SYNCHRONIZING QUADRATURE AMPLITUDE MODULE (QAM), as well as U.S. patent application Ser. No. 13/358,463, filed Jan. 22, 2012, entitled SELF-LEVELING INSPECTION SYSTEMS AND METHODS. The content of each of these applications is incorporated by reference herein in its entirety.

In some embodiments, a coupled buried object locator (not shown), such as a locator as described in co-assigned patents and patent applications including the '474 application, U.S. Provisional Patent Application Ser. No. 61/607,510, filed Mar. 6, 2012, entitled DUAL SENSED LOCATING SYSTEMS AND METHODS, U.S. patent application Ser. No. 10/268,641, entitled OMNIDIRECTIONAL SONDE AND LINE LOCATOR, filed on Oct. 9, 2002, U.S. patent application Ser. No. 11/970,818, entitled MULTI-SENSOR MAPPING OMNIDIRECTIONAL SONDE AND LINE LOCATORS, filed on Jan. 8, 2008, U.S. patent application Ser. No. 12/016,870, entitled RECONFIGURABLE PORTABLE LOCATOR EMPLOYING MULTIPLE SENSOR ARRAY HAVING FLEXIBLE NESTED ORTHOGONAL ANTENNAS, filed Jan. 18, 2008, U.S. patent application Ser. No. 11/077,947, entitled SINGLE AND MULTI-TRACE OMNIDIRECTIONAL SONDE AND LINE LOCATORS AND TRANSMITTER USED THEREWITH, now U.S. Pat. No. 7,619,516, U.S. patent application Ser. No. 13/161,183, filed Jun. 15, 2011, entitled GROUND-TRACKING DEVICES FOR USE WITH A MAPPING LOCATOR, U.S. patent application Ser. No. 61/485,078, entitled LOCATOR ANTENNA CONFIGURATION, filed on May 11, 2011, or in other co-assigned patents or applications, may include a communications link to send depth information based on a determined depth of a buried object or sonde to the CCU, where it may then be associated with captured video, images, audio, location information, and/or other data and information and displayed and/or stored in memory in conjunction with the images, video, audio, and/or other data for later use during post-processing, viewing, analyzing, and the like. An example of this configuration is shown in FIG. 14, where buried object locator 1490 sends data wirelessly through connection 1437, such as depth and/or location information of the camera head as determined based on electromagnetic fields generated from a sonde in the camera head or in proximity the camera head, to CCU 1430 and/or to other system components, such as remote computing system 1470 or local display/control sub-system 1450.

Figure 16:
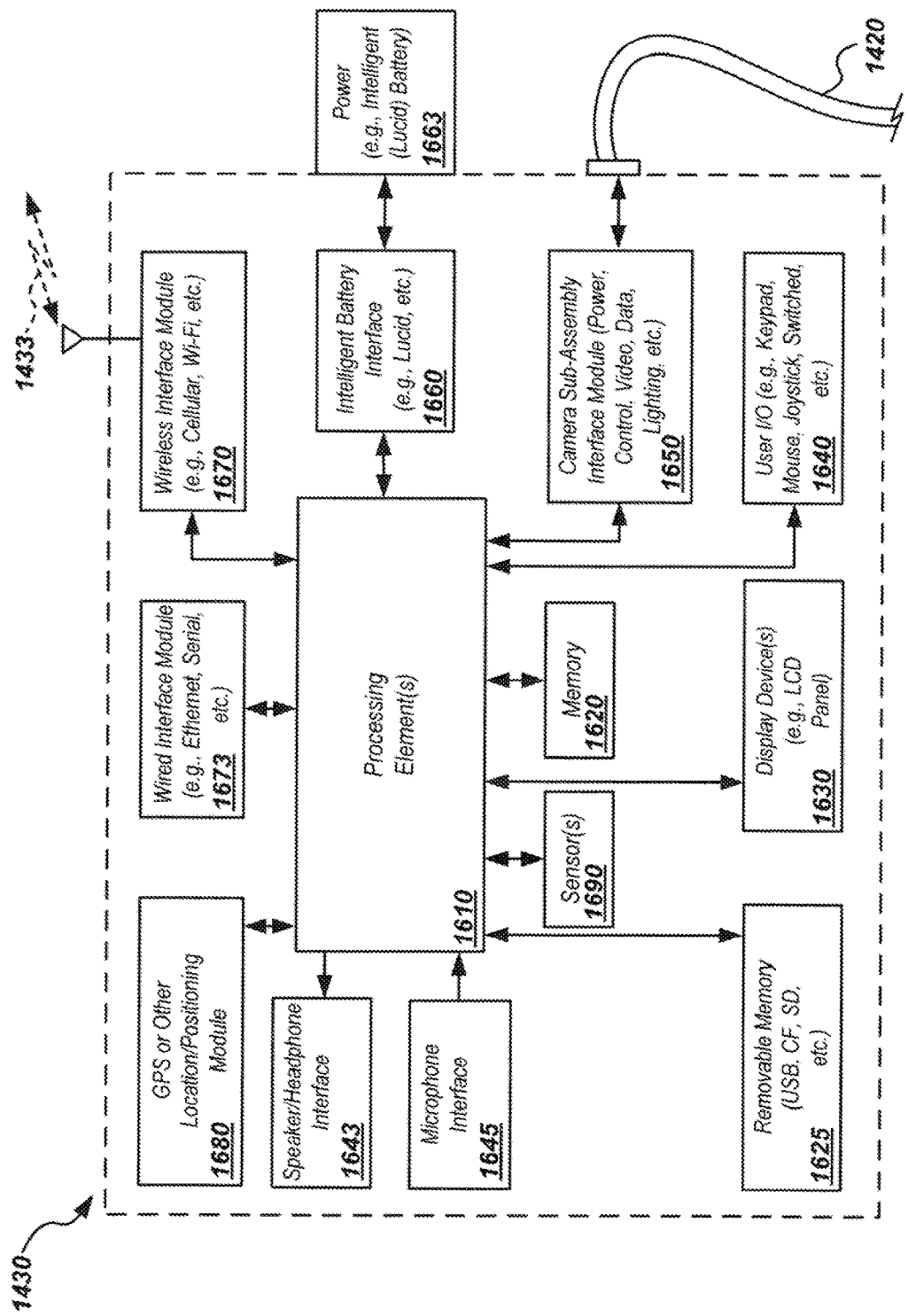
FIG. 16 illustrates details of an embodiment of a CCU as may be used in the systems of FIGS. 1A and 1B and FIG. 14.

Turning to FIG. 16, additional details of an embodiment of camera control unit (CCU) 1430 in accordance with certain aspects are illustrated. Various CCU embodiments may include some or all of the various modules illustrated in FIG. 16 (and/or other modules not shown) including, for example, one or more processing element 1610, one or more coupled internal memories 1620 to store data and/or instructions used by the processing element(s) 1610, one or more external memories 1625 and associated electrical and mechanical coupling mechanisms (e.g., full-size or miniature USB ports, secure digital (SD) ports, compact flash (CF) ports, and the like). The external memories 1625 allow users to plug in USB thumb drives or other memory sticks or cards and store data and information during inspection operations, such as images, video, sensor data, location/position data, depth data, audio annotations, textual annotations, and the like and remove the memory device to transfer the captured information to other devices or systems.

In addition, CCU 1430 may include a speaker/headphone interface 1643 and associated speakers, headphones, or other audio output devices, a microphone input interface 1645, to allow a user to record audio annotations or other information during inspections, user input output devices 1640, such as keypads, computer mice or joysticks, switches, touchpads, and the like. In some embodiments, a magnetically sensed manual user interface device, such as described in the following co-assigned United States patent applications, may be used in CCU embodiments: U.S. patent application Ser. No. 13/110,910, entitled USER INTERFACE DEVICES, APPARATUS, AND METHODS, filed May 18, 2011; U.S. patent application Ser. No. 13/214,209, entitled MAGNETIC SENSING USER INTERFACE DEVICE METHODS AND APPARATUS, filed Aug. 21, 2011; U.S. patent application Ser. No. 13/272,172, entitled MAGNETIC THUMBSTICK USER INTERFACE DEVICES, filed Oct. 12, 2011; U.S. patent application Ser. No. 13/292,038 entitled SLIM PROFILE MAGNETIC USER INTERFACE DEVICES, filed Nov. 8, 2011; and U.S. patent application Ser. No. 13/310,670, entitled MAGNETI- CALLY SENSED USER INTERFACE APPARATUS AND DEVICES, filed Dec. 2, 2011. The content of each of these applications is incorporated by reference herein.

CCU 1430 may also include a camera sub-assembly interface modules for inter-facing to coupled cameras and sending control information and receiving data, images, video, or other information from coupled cameras. An intelligent battery interface module 1660, such as described in co-assigned U.S. patent application Ser. No. 13/532,721, filed Jun. 25, 2012, entitled MODULAR BATTERY PACK APPARATUS, SYSTEMS, AND METHODS, may be included in CCU 1430 to provide intelligent battery functionality when an intelligent or "Lucid" battery 1663 is attached to the CCU 1430. Wired or wireless interface modules, such as wireless module 1670 and wired module 1673 may be included in CCU 1430 to provide data communications to other devices or systems, such as those shown in FIGS. 1A and 1B. CCU 1430 may also include one or more GPS or other location or position modules 1680 to receive signals and determine location or position information, which may then be associated with received camera images, video, sensor data, or other data or information.

The CCU 1430 may further include sensor(s) 1690, such as, for example, inertial sensors such as accelerometers to detect acceleration, tilt, shock, vibration, and the like, compass sensors, gyroscopic sensors, gravitational orientation sensors, motion sensors, physical parameter sensors such as temperature sensors, moisture sensors, humidity sensors, pressure or barometric sensors, gas or liquid sensors, microphones or other acoustic sensors, electromagnetic field sensors, one or more axis geophones, and/or other sensing devices.

In some configurations, the apparatus, circuit, modules, or systems described herein may include means for implementing features or providing functions described herein. In one aspect, the aforementioned means may be a module including a processing element including a processor or processors, associated memory and/or other electronics in which embodiments of the invention reside, such as to implement signal processing, switching, data transmission or reception, or other functions to process and/or condition camera outputs, locator outputs, integrate image and video data with other location, position, locator, or other sensor data, receive user inputs, and/or provide other electronic functions described herein. These may be, for example, modules or apparatus residing in buried object CCUs, cameras, locators, coupling apparatus, and/or other related equipment or devices.

In one or more exemplary embodiments, the electronic functions, methods and processes described herein and associated with cameras and camera control units may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to camera and CCUs may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the appended claims and their equivalents.

We claim:

1. A pipe inspection system, comprising:
a camera;
a push-cable including a plurality of conductors electrically coupled to the camera at a distal end;
a cable reel for storing the push-cable; and
a dockable camera control unit (CCU) electrically coupled to the plurality of conductors at a proximal end, the camera control unit including:
a body;
one or more electronic circuits for controlling operation of components of the CCU; and
a docking mechanism for removably coupling the body to the cable reel.

2. The pipe inspection system of claim 1, further including a handle permanently mounted or removably attachable to the body.

3. The pipe inspection system of claim 2, further including a rotatable kickstand comprising two supports, wherein the handle and the two supports can be configured into a tripod.

4. The pipe inspection system of claim 1, further including;
a display cover; and
a switching circuit configured to provide selective power control of the one or more electronic circuits responsive to an opening or closing of the display cover.

5. The pipe inspection system of claim 4, wherein the display cover is a protective sun hood and wherein providing selective power control of the one or more electronic circuits responsive to an opening or closing of the display cover further comprises powering up the CCU, putting it into sleep or hibernation modes or waking it up.

6. The system of claim 4, wherein the switching circuit is magnetic or electro-mechanical.

7. The system of claim 1, further comprising a plurality of removable ports configured to be compatible with one or more devices, wherein the devices include one or more USB thumb drives or other storage media, or one or more wireless communication links including WiFi or Bluetooth.

8. The system of claim 1, wherein a portion of elements of the CCU include power control of a wireless communications module of the CCU.

9. The system of claim 1, wherein the camera is a digitally self-leveling video inspection camera including electronics for rotating a camera image or video digitally to a reference orientation.

10. The system of claim 8, further including a buried object locator, wherein the locator includes electronics for wirelessly communicating with the wireless communications module of the CCU.

11. The system of claim 10, wherein one or more of depth, position, or other data detected by the locator is wirelessly transmitted to the CCU.

12. The system of claim 11, wherein depth, position, or other data received by the CCU from the locator are associated with images, video, and/or other inspection data for display, storage, and/or wireless transmission to the locator or other devices.

13. The system of claim 12, wherein other devices includes Sondes or other beacons.

14. The system of claim 10, wherein wirelessly communicating comprises using one or more wireless protocols including Wi-Fi, Bluetooth, cellular, or other wireless links.

15. The system of claim 10, wherein the wireless communication module is an ISM radio link configured to exchange data with other devices.

16. The system of claim 15, wherein other devices include locators, beacons, and transmitters.

17. The system of claim 16, wherein the beacon is a Sonde.

* * * * *